United States Patent
Liao et al.

(10) Patent No.: US 7,403,209 B2
(45) Date of Patent: Jul. 22, 2008

(54) RENDERING IMAGES CONTAINING VIDEO

(75) Inventors: Bin Liao, Cheltenham (AU); Farris Junius Halim, Kingsford (AU); Ping Liu, Cheltenham (AU); Eugene Robert Arena, Manly (AU)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 11/081,724

(22) Filed: Mar. 17, 2005

(65) Prior Publication Data

US 2005/0212799 A1 Sep. 29, 2005

(30) Foreign Application Priority Data

Mar. 24, 2004 (AU) .............................. 2004901571

(51) Int. Cl.
- G09G 5/00 (2006.01)
- G09G 5/10 (2006.01)
- G06K 9/36 (2006.01)
- G06K 9/46 (2006.01)
- G06T 11/20 (2006.01)

(52) U.S. Cl. ................. 345/629; 345/420; 345/421; 345/440; 345/441; 345/630; 345/648; 345/589; 345/590; 345/592; 345/619; 382/240; 382/284

(58) Field of Classification Search ................. 345/530, 345/629, 420, 619, 473–474, 630, 648, 589, 345/590, 592, 440–441; 382/162, 284; 715/723
See application file for complete search history.

(56) References Cited

U.S. PATENT DOCUMENTS

| | | | |
|---|---|---|---|
| 5,237,648 A | 8/1993 | Mills et al. ................ 395/133 |
| 5,469,536 A | 11/1995 | Blank .......................... 395/131 |
| 5,923,791 A * | 7/1999 | Hanna et al. ................. 382/295 |
| 6,392,712 B1 | 5/2002 | Gryskiewicz et al. ....... 348/584 |
| 6,504,577 B1 | 1/2003 | Voltz et al. .................. 348/448 |
| 6,683,619 B1 * | 1/2004 | Samra .......................... 345/619 |
| 6,751,347 B2 * | 6/2004 | Pettigrew et al. ............ 382/162 |
| 6,795,589 B1 * | 9/2004 | Tlaskal et al. ................ 382/284 |
| 6,816,619 B2 * | 11/2004 | Tlaskal et al. ................ 382/240 |
| 6,867,782 B2 * | 3/2005 | Gaudette et al. ............. 345/530 |
| 6,954,611 B2 * | 10/2005 | Hashimoto et al. ......... 455/3.01 |
| 6,985,161 B1 * | 1/2006 | Politis ......................... 345/629 |
| 7,016,011 B2 * | 3/2006 | De Haan ....................... 352/43 |
| 7,190,376 B1 * | 3/2007 | Tonisson ..................... 345/629 |
| 2002/0027563 A1 * | 3/2002 | Van Doan et al. ........... 345/630 |
| 2002/0196296 A1 | 12/2002 | Gu ................................ 347/1 |
| 2003/0118250 A1 * | 6/2003 | Tlaskal et al. ............... 382/284 |

* cited by examiner

*Primary Examiner*—Jin-Cheng Wang
(74) *Attorney, Agent, or Firm*—Fitzpatrick, Cella, Harper & Scinto

(57) ABSTRACT

A video node for use in rendering one or more video frames of a video stream. The video node is represented by a compositing tree (2100). The compositing tree (2100) comprises at least one image primitive node (2140) representing one or more video frames (2300) of the video stream. At least one of the video frames (2300) represented by the image primitive node (2140) is composited with at least one further graphical primitive represented by at least one further primitive node (2130) of the compositing tree (2100). The video frame (2300) is composited with the further graphical primitive according to a compositing operation represented by an operation node of the compositing tree (2100) in order to generate a composite image (2303) represented by at least one composite node (2150) of the compositing tree (2100).

29 Claims, 20 Drawing Sheets

RENDERING IMAGES CONTAINING VIDEO

CROSS-REFERENCE TO RELATED PATENT APPLICATIONS

This application claims the right of priority under 35 U.S.C. § 119 based on Australian Patent Application No. 2004901571, filed 24 Mar. 2004, which is incorporated by reference herein in its entirety as if fully set forth herein.

FIELD OF THE INVENTION

The present invention relates generally to image processing and, in particular, to rendering video images comprising a plurality of frames. The present invention also relates to a method and apparatus for rendering video images, and to a computer program product including a computer readable medium having recorded thereon a computer program for rendering video images.

BACKGROUND

Many existing graphics rendering systems provide images, text and line work as "primitives". The term primitive refers to a base graphical element used in the creation of a complex graphical image. In order to display video images on such graphics rendering systems, software applications executing on the systems need to constantly update the contents of image primitives. These software applications also have to process audio data associated with the image primitives. The need to update image primitives constantly makes it difficult for software applications to process multiple video streams, or to composite multiple video images and still images.

In order to improve the processing of multiple video streams, some existing graphics rendering systems provide video images as a series of image primitives. However, these rendering systems are typically limited in their ability to composite video with other video or still graphical primitives or to create special effects. Such rendering systems typically also require special hardware.

Thus a need clearly exists for an improved method and apparatus for rendering an image and, in particular, for rendering video images.

SUMMARY

It is an object of the present invention to substantially overcome, or at least ameliorate, one or more disadvantages of existing arrangements.

According to one aspect of the present invention there is provided a video node for use in rendering one or more video frames of a video stream, said video node being represented by a compositing tree, said compositing tree comprising at least one image primitive node representing one or more video frames of said video stream, at least one of said video frames represented by said image primitive node being composited with at least one further graphical primitive represented by at least one further primitive node of said compositing tree, said at least one video frame being composited with said further graphical primitive according to a compositing operation represented by an operation node of said compositing tree in order to generate a composite image represented by at least one composite node of said compositing tree.

According to another aspect of the present invention there is provided a method of rendering an image, said image being formed by compositing one or more graphical primitives according to a compositing tree, said compositing tree comprising a plurality of nodes each representing a graphical primitive of said image or an operation for combining said graphical primitives, said method comprising the steps of:

representing one or more video frames of a video sequence by at least one of said primitive nodes;

compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and compositing the composite image represented by said at least one composite node with one or more other composite images represented by other composite nodes of said compositing tree, according to a further operation represented by a further operation node of said compositing tree, in order to render said image, wherein one or more attributes of said video frames are changeable by changing an attribute of said further operation node.

According to still another aspect of the present invention there is provided a method of creating a video node representing one or more video frames of a video sequence, said video node being created according to a compositing tree, said compositing tree comprising a plurality of nodes each representing a graphical primitive or an operation for combining said graphical primitives, said method comprising the steps of:

representing said one or more video frames of said video sequence by at least one of said primitive nodes;

compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and compositing the composite image represented by said at least one composite node with one or more other ones of said graphical primitives represented by other ones of said primitive nodes of said compositing tree, according to a further operation represented by said video node, in order to create said video node representing said one or more video frames, wherein one or more attributes of said video frames are changeable by changing an attribute of said video node.

According to still another aspect of the present invention there is provided an apparatus for rendering an image, said image being formed by compositing one or more graphical primitives according to a compositing tree, said compositing tree comprising a plurality of nodes each representing a graphical primitive of said image or an operation for combining said graphical primitives, said apparatus comprising:

representation means for representing one or more video frames of a video sequence by at least one of said primitive nodes;

compositing means for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and further compositing means for compositing the composite image represented by said at least one composite node with one or more other composite images represented by other composite nodes of said compositing tree, according to a further operation represented by a further operation node of said compositing tree, in order to render said image, wherein one or more attributes of said video frames are changeable by changing an attribute of said further operation node.

According to still another aspect of the present invention there is provided an apparatus for creating a video node representing one or more video frames of a video sequence, said video node being created according to a compositing tree, said compositing tree comprising a plurality of nodes each representing a graphical primitive or an operation for combining said graphical primitives, said apparatus comprising:

representation means for representing said one or more video frames of said video sequence by at least one of said primitive nodes;

compositing means for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and further compositing means for compositing the composite image represented by said at least one composite node with one or more other ones of said graphical primitives represented by other ones of said primitive nodes of said compositing tree, according to a further operation represented by said video node, in order to create said video node representing said one or more video frames, wherein one or more attributes of said video frames are changeable by changing an attribute of said video node.

According to still another aspect of the present invention there is provided a computer program product including a computer readable medium comprising recorded thereon a computer program for rendering an image, said image being formed by compositing one or more graphical primitives according to a compositing tree, said compositing tree comprising a plurality of nodes each representing a graphical primitive of said image or an operation for combining said graphical primitives, said computer program comprising:

code for representing one or more video frames of a video sequence by at least one of said primitive nodes;

code for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and code for compositing the composite image represented by said at least one composite node with one or more other composite images represented by other composite nodes of said compositing tree, according to a further operation represented by a further operation node of said compositing tree, in order to render said image, wherein one or more attributes of said video frames are changeable by changing an attribute of said further operation node.

According to still another aspect of the present invention there is provided a computer program product including a computer readable medium comprising recorded thereon a computer program for creating a video node representing one or more video frames of a video sequence, said video node being created according to a compositing tree, said compositing tree comprising a plurality of nodes each representing a graphical primitive or an operation for combining said graphical primitives, said computer program comprising:

code for representing said one or more video frames of said video sequence by at least one of said primitive nodes;

code for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and code for compositing the composite image represented by said at least one composite node with one or more other ones of said graphical primitives represented by other ones of said primitive nodes of said compositing tree, according to a further operation represented by said video node, in order to create said video node representing said one or more video frames, wherein one or more attributes of said video frames are changeable by changing an attribute of said video node.

According to still another aspect of the present invention there is provided a computer program for rendering an image, said image being formed by compositing one or more graphical primitives according to a compositing tree, said compositing tree comprising a plurality of nodes each representing a graphical primitive of said image or an operation for combining said graphical primitives, said computer program comprising:

code for representing one or more video frames of a video sequence by at least one of said primitive nodes;

code for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and code for compositing the composite image represented by said at least one composite node with one or more other composite images represented by other composite nodes of said compositing tree, according to a further operation represented by a further operation node of said compositing tree, in order to render said image, wherein one or more attributes of said video frames are changeable by changing an attribute of said further operation node.

According to still another aspect of the present invention there is provided a computer program for creating a video node representing one or more video frames of a video sequence, said video node being created according to a compositing tree, said compositing tree comprising a plurality of nodes each representing a graphical primitive or an operation for combining said graphical primitives, said computer program comprising:

code for representing said one or more video frames of said video sequence by at least one of said primitive nodes;

code for compositing at least one of said video frames represented by said at least one primitive node with at least one further graphical primitive represented by at least one further primitive node of said compositing tree, according to a first operation represented by a first operation node of said compositing tree, in order to generate a composite image represented by at least one composite node of said compositing tree; and code for compositing the composite image represented by said at least one composite node with one or more other ones of said graphical primitives represented by other ones of said primitive nodes of said compositing tree, according to a further operation represented by said video node, in order to create said video node representing said one or more video frames, wherein one or more attributes of said video frames are changeable by changing an attribute of said video node.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
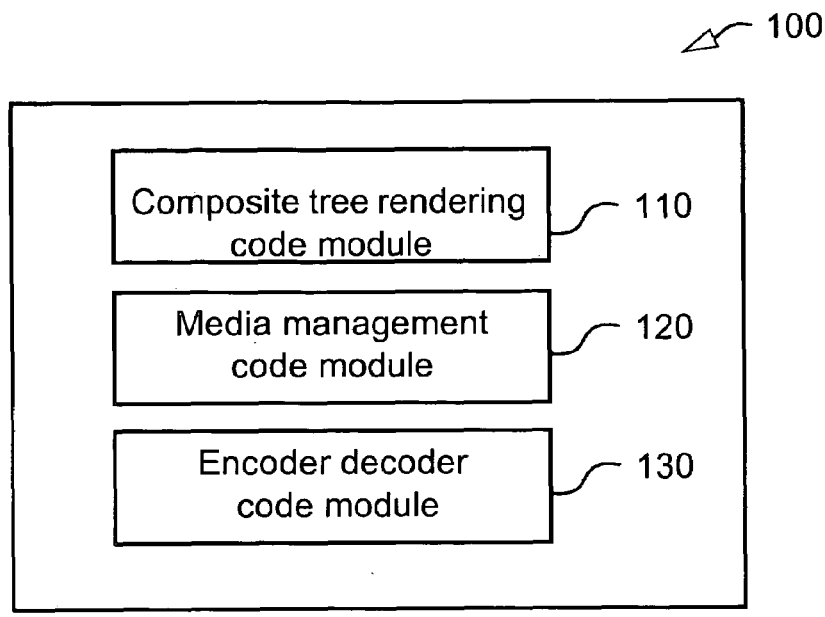
FIG. 1 is a schematic block diagram showing software code modules for implementing arrangements described.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Figure 7:
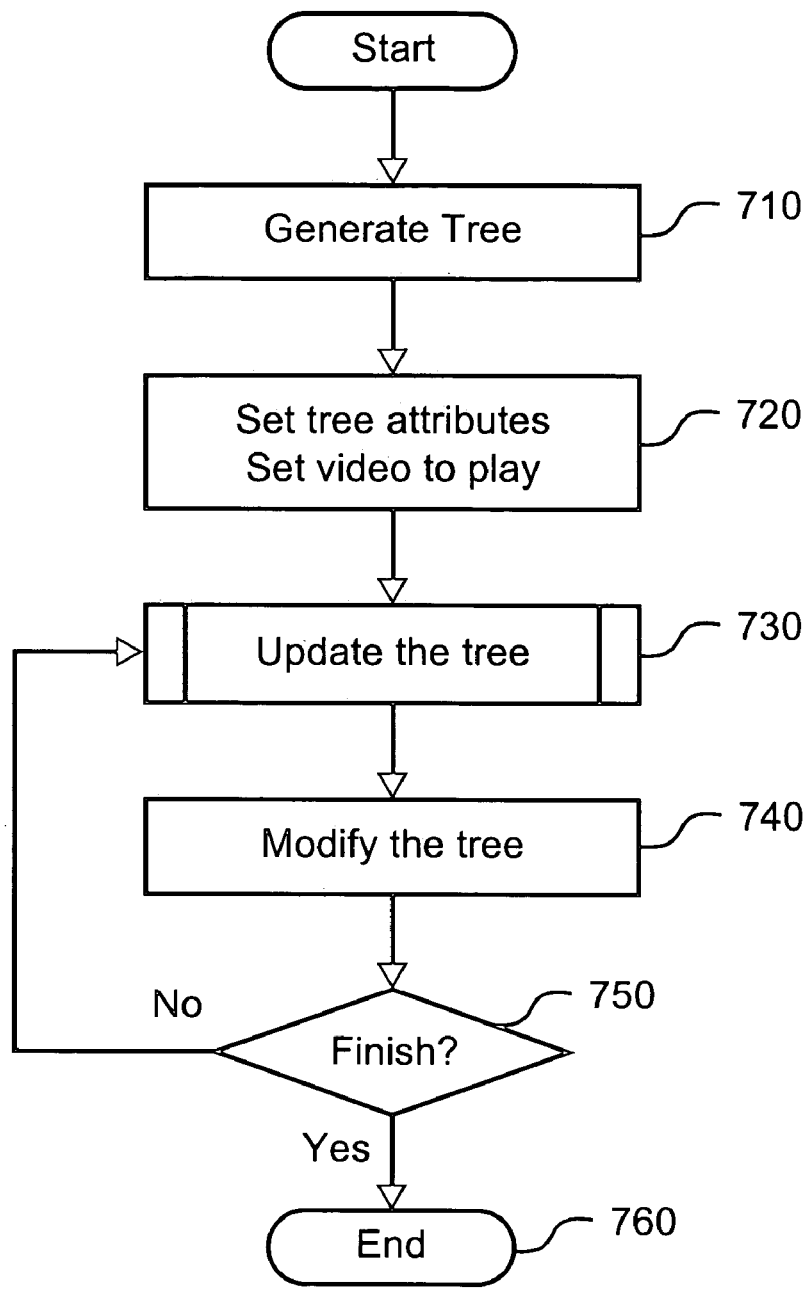
FIG. 7 is a flow diagram showing a method of rendering images.
Figure 8:
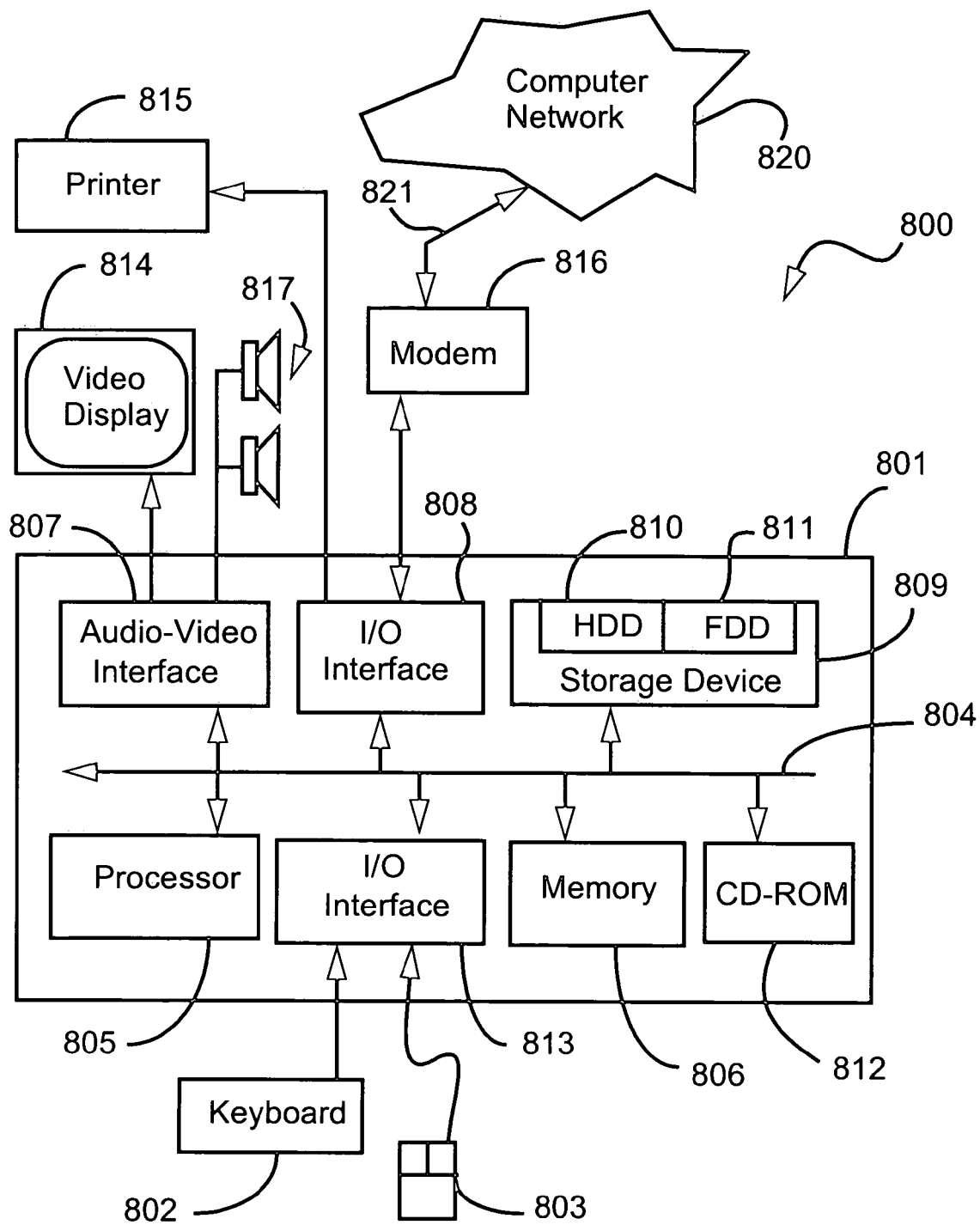
FIG. 8 is a schematic block diagram of a general purpose computer upon which arrangements described may be practiced.

A general purpose computer system 800 upon which arrangements described below may be practiced is shown in FIG. 8. In particular, the methods of FIGS. 1 to 23 may be implemented as software, such as an application program executing within the computer system 800. In particular, the steps of the described methods may be effected by instructions in the software that are carried out by the computer system 800. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software may be loaded into the computer from the computer readable medium, and then executed by the computer. A computer readable medium having such software or computer program recorded on it is a computer program product. The use of the computer program product in the computer preferably effects an advantageous apparatus for implementing the described method.

The computer system 800 is formed by a computer module 801, input devices such as a keyboard 802 and mouse 803, output devices including a printer 815, a display device 814 and loudspeakers 817. A Modulator-Demodulator (Modem) transceiver device 816 is used by the computer module 801 for communicating to and from a communications network 820, for example, connectable via a telephone line 821 or other functional medium. The modem 816 may be used to obtain access to the Internet, and other network systems, such as a Local Area Network (LAN) or a Wide Area Network (WAN), and may be incorporated into the computer module 801 in some implementations.

The computer module 801 typically includes at least one processor unit 805, and a memory unit 806, for example formed from semiconductor random access memory (RAM) and read only memory (ROM). The module 801 also includes a number of input/output (I/O) interfaces including an audio-video interface 807 that couples to the video display 814 and loudspeakers 817, an I/O interface 813 for the keyboard 802 and mouse 803 and optionally a joystick (not illustrated), and an interface 808 for the modem 816 and printer 815. In some implementations, the modem 8116 may be incorporated within the computer module 801, for example within the interface 808. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the described arrangements can be practised include IBM-PC's and compatibles, Sun Sparcstations or alike computer systems evolved therefrom.

Typically, the software implementing the described methods is resident on the hard disk drive 810 and is read and controlled in its execution by the processor 805. Intermediate storage of the program and any data fetched from the network 820 may be accomplished using the semiconductor memory 806, possibly in concert with the hard disk drive 810. In some instances, the software may be supplied as an application program supplied to the user encoded on a CD-ROM or floppy disk and read via the corresponding drive 812 or 811, or alternatively may be read by the user from the network 820 via the modem device 816. Still further, the software may also be loaded into the computer system 800 from other computer readable media. The term "computer readable medium" as used herein refers to any storage or transmission medium that participates in providing instructions and/or data to the computer system 800 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 801. Examples of transmission media include radio or infra-red transmission channels as well as a network connection to another computer or networked device, and the Internet or Intranets including e-mail transmissions and information recorded on Websites and the like.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Many existing graphics rendering systems use what is known as an 'immediate mode' application programming interface (API) between an application program and a rendering system. For each video frame to be rendered, for example, a complete corresponding set of rendering commands are sent to the API by the application program. In contrast, a 'retained mode' API provides a complete compositing tree on a per-frame basis. For such a retained mode API an application program provides an initial compositing tree. The initial compositing tree is then modified for each video frame in a video stream in order to effect a change in an image being displayed.

Modifications which may be made to a compositing tree include geometrically transforming part of the compositing tree or the entire compositing tree. The structure of a compositing tree may also be modified by unlinking and linking subtrees or nodes. Attributes (eg: colour or opacity) of individual nodes of a compositing tree may also be changed/modified.

In retained mode rendering systems, graphical primitives may be used to build a compositing tree. Primitives form the leaf nodes of such a compositing tree. Six graphics primitives may be defined below as follows:

(i) text: includes a variety of fonts specified at various sizes;
(ii) paths: graphical objects having associated outlines defined by spline data;
(iii) pixel data: digital images;
(iv) plane-fill: a graphical element that is used as the background of an image being created and is at least as large as the image;
(v) colour blends: areas of changing colour that may fill an irregular shape; and
(vi) triangle meshes or triangle lists.

Compositing is the process of combining several graphical primitives to represent a final image. Graphical primitives may be combined using operators to represent more complex graphical images. The result of combining graphical primitives may likewise be combined using the same set of operators to form a compositing tree representing any desired image.

A sequence of images may be generated by repeatedly rendering or "updating" a compositing tree representing the image sequence. In a compositing tree, graphical primitives are represented by the leaf nodes of the compositing tree and compositing operations are represented by the internal nodes of the compositing tree. The leaf nodes will be referred to below as "primitive nodes" and the internal nodes will be referred to as "composite nodes."

Primitive nodes and composite nodes may have different attributes associated with the nodes. These attributes may include transform matrices, colour, opacity and quality. Such attributes may be stored in memory 806 and referenced by a corresponding node. A transform matrix determines the final position that a graphical primitive represented by a corresponding node will appear on a rendering target (e.g., the display screen 814). The attributes such as opacity and colour apply to primitive nodes. Two new primitive types, namely a "video primitive" and an "audio primitive", are described below for use in a retained mode rendering system.

As described above, the software program implementing the described methods may be effected by instructions being executed by the processor 805. The instructions may be formed as one or more code modules, each for performing one or more particular tasks. In one implementation, the software 100 may have three core code modules 110, 120 and 130 as shown in FIG. 1. A rendering code module 110 may be used to perform updating of a compositing tree representing an image to be displayed on the display 814, for example. A media management code module 120 may be used to perform media related functions. An encoder/decoder code module 130 may be used to provide encoding and decoding support to the media management code module 120.

Figure 19A:
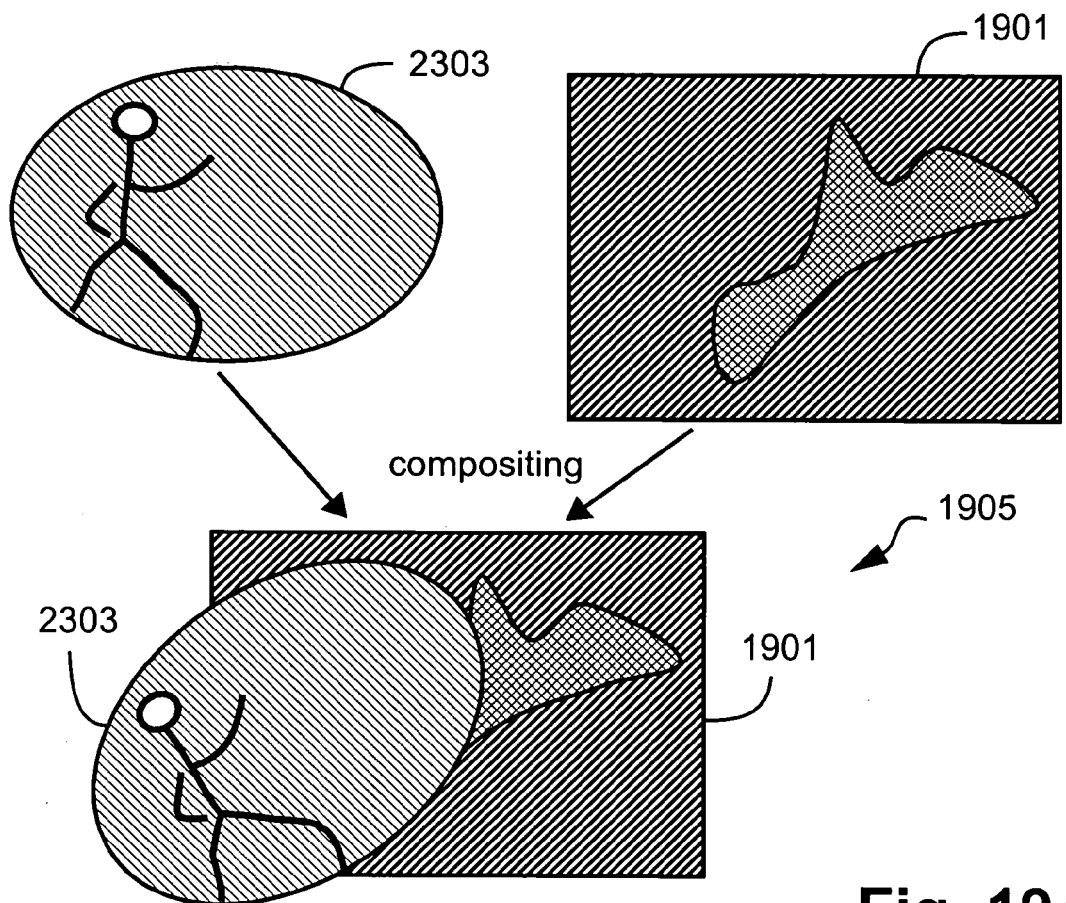
FIG. 19A shows the result of rendering a compositing tree of FIG. 21 at a first point in time.
Figure 21:
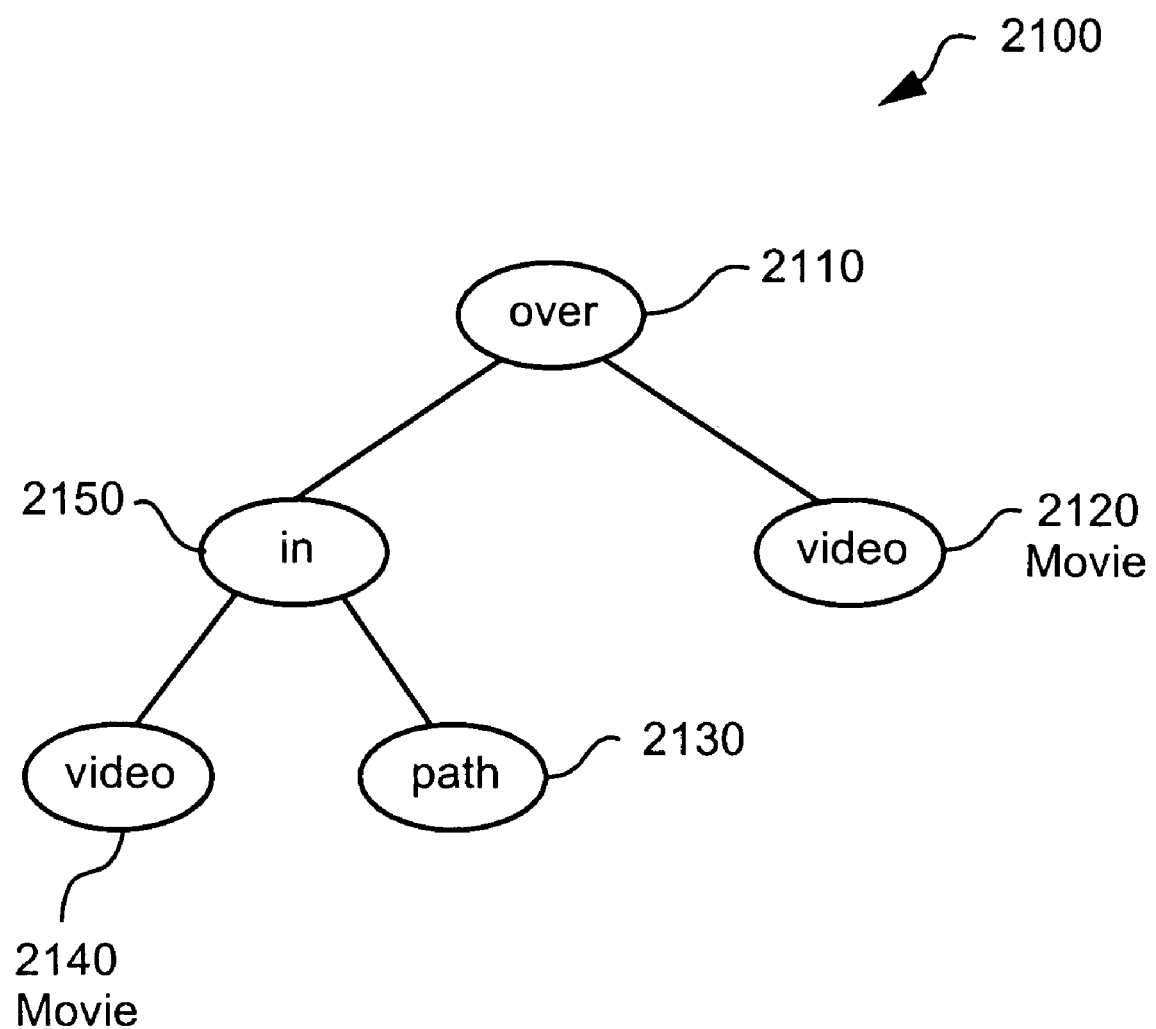
FIG. 21 shows an example of a compositing tree.
Figure 23:
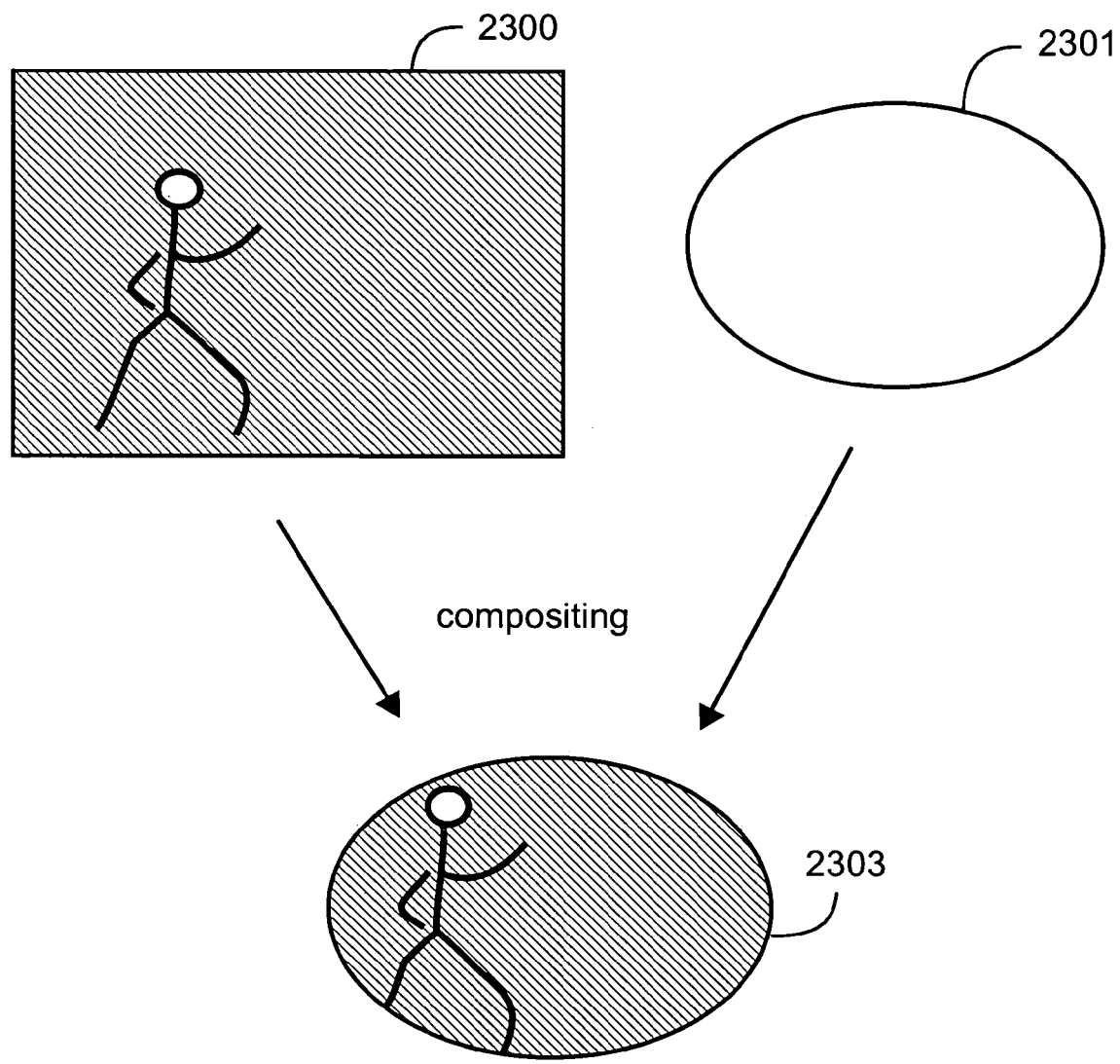
FIG. 23 shows the result of an "in" compositing operation.

In order to describe the code modules 110, 120 and 130 in more detail, an example of a compositing tree 2100 representing an image to be displayed on the display 314 will now be described with reference to FIG. 21. The compositing tree 2100 comprises three primitive nodes 2120, 2130 and 2140, and two composite nodes 2110 and 2150. The primitive node 2140 is a video primitive node or a "video node". The video node 2140 represents a video primitive. In the present example, the video primitive is a video movie 2300, as seen in FIG. 23. Frames of the video movie 2300 may be stored in a video file stored in memory 806, which is referenced by the video node 2140. Alternatively, the video movie 2300 may be live streamed digital video (e.g., input via the communications network 820). The primitive node 2130 represents a path primitive. In the present example, the path primitive represented by the node 2130 is a circle shape path 2301, as seen in FIG. 23. A representation of the circle shaped path 2301 may be stored in a memory buffer configured within memory 806 and referenced by the node 2130. The primitive node 2120 is a video node. In the present example, the video node 2120 represents a video movie 1901, as seen in FIG. 19. Frames of the video movie 1901 may be stored in a video file stored in memory 806 or live streamed digital video may be used. The composite node 2150 represents the result 2303 of an "in" operation. The result 2303 of the in operation is the video movie 2300 clipped within the circle shape 2301, as shown in FIG. 23, and may be stored in an intermediate buffer configured within memory 806. The composite node 2110 represents a final composite result 1905, as shown in FIG. 19A, and again may be stored in an intermediate buffer configured within memory 806. The final composite result 1905 will be explained in further detail below.

Figure 22:
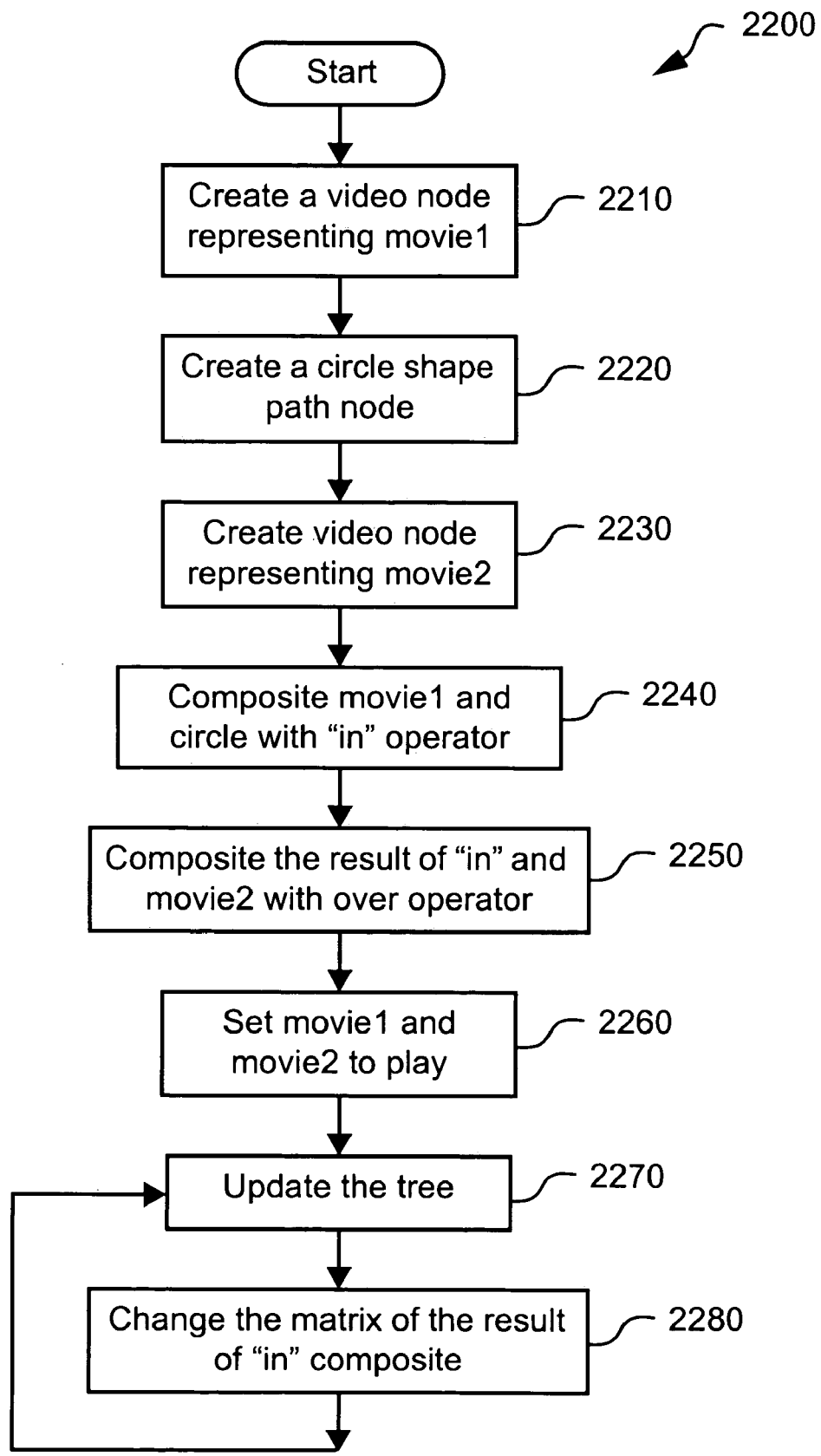
FIG. 22 is a flow diagram showing a method of creating the compositing tree of FIG. 21 and updating the compositing tree on the display screen of FIG. 8.

FIG. 22 is a flow diagram showing a method 2200 of creating the compositing tree 2100 representing an image to be rendered (e.g., rendered on the display 814 or to a buffer configured within memory 806). The method 2200 also updates the compositing tree 2100 in order to update the rendered image. The method 2200 may be implemented as software resident on the hard disk drive 810 and being controlled in its execution by the processor 805.

The method 2200 begins at the first step 2210, where the processor 805 creates the video node 2140 representing the video movie 2300. In this present example, the video movie 2300 is used as an input video source to the video node 2140 and the frames of the video movie 2300 may be configured within a video file stored in memory 806, which is referenced by the video node 2140. At the next step 2220, the primitive node 2130 is created to represent the circle shape path 2301. Then at step 2230, the video node 2120 is created to represent the video movie 1901 and the video movie 1901 is used as an input video source to the video node 2120. Again, frames of the video movie 1901 may be stored in a video file configured within memory 806 and referenced by the video node 2120.

Figure 19B:
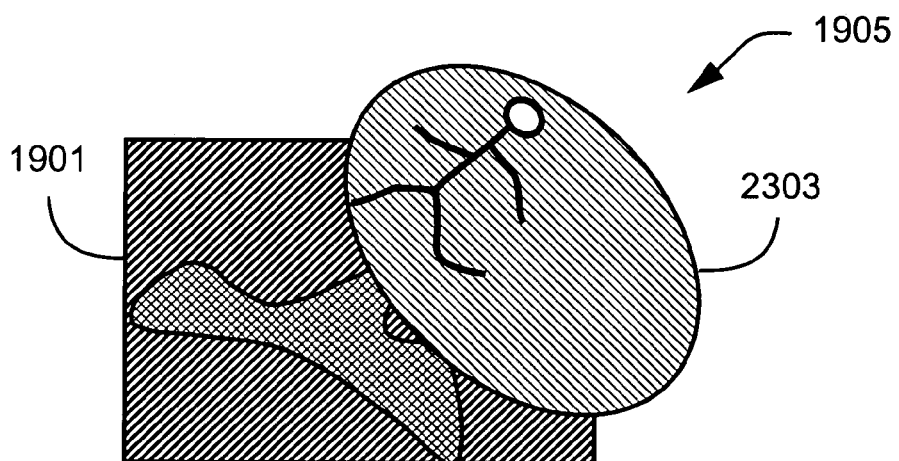
FIG. 19B shows the result of rendering the compositing tree of FIG. 21 at a second point in time.

The method 2200 continues at the next step 2240, where the video movie 2300 is clipped within the circle shape 2301 by compositing each of the frames of the video movie 2300 "in" the circle shape 2301. That is, the video node 2140 is composited with the primitive node 2130 using the in operation. The result of the in operation (i.e., the clipped movie 2303) is represented by the composite node 2150. Frames of the clipped movie 2303 may be stored in a video file configured within memory 806, which is referenced by the composite node 2150. Alternatively, the frames of the clipped movie 2303 may be rendered to an intermediate buffer configured within memory 806. At the next step 2250, the clipped movie 2303 is placed on top of the video movie 1901 by compositing the frames of the clipped movie 2303 "over" frames of the video movie 1901. Again, the result of the over operation may be stored in a video file configured within memory 806, which is referenced by the composite node 2150, or rendered to an intermediate buffer configured within memory 806. Then at step 2260, the video node 2140 and video node 2120 are set to a playing mode. The video nodes 2140 and 2120 may be set to play, for example, by executing the video files containing the frames of the video movies 2300 and 1901, respectively, or the video file containing the result of the over operation. The setting of video nodes 2140 and 2120 to play may be triggered by altering the state of a variable associated with each of the nodes 2140 and 2120, for example. Similarly, the playback rate of the video frames of the movies 2300 and 1901, the volume of audio associated with the video frames and the opacity of the video frames may be changed by altering the state of a variable associated with each of the video nodes 2140 and 2120, for example. In the following steps 2270 and 2280 the compositing tree 2100 gets updated regularly. A transform matrix of the composite node 2150 is changed before each update. The final output 1905 as seen in FIGS. 19A and 19B is the video movie 1901 playing at the same screen position at all times, while the video movie 2300 plays inside the circle shape 2301 and moves around due to the transform matrix associated with the node 2150 changing as the compositing tree 2100 is updated. The updating of the compositing tree 2100 will be explained in more detail below with reference to FIG. 9.

The rendering code module 110 executes in a retained-mode rendering manner and thereby, supports a compositing tree structure and compositing operations. In particular, the rendering code module 110 supports the operations "plus" and at least one of "in" or "out". Alternatively, the operations "over" or "rover" may be used instead of "plus". (Note: "rover" is the same as "over" with the operands reversed.) Using the operations "plus" and "in" or "plus" and "out", the media management code module 120 may preform opacity operations on graphical primitives and in particular video images in an efficient manner.

Figure 3A:
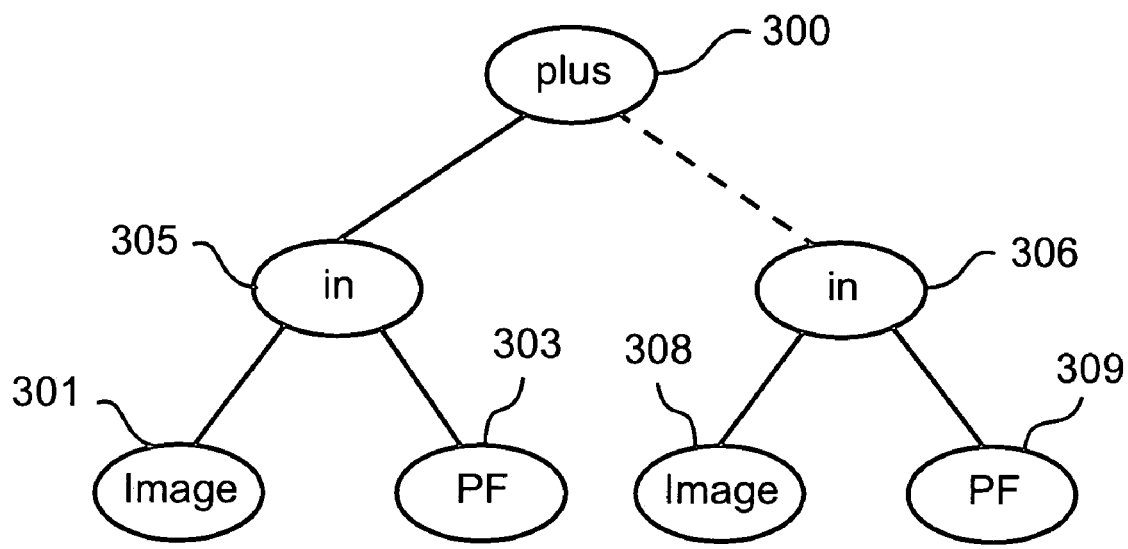
FIG. 3A shows an example of a video node.
Figure 3B:
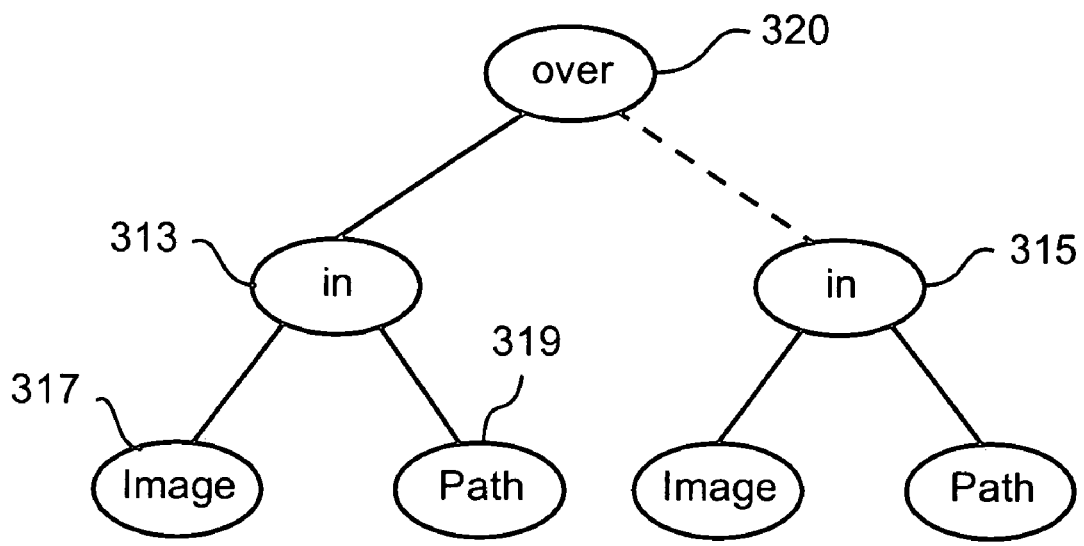
FIG. 3B shows an example of another video node.
Figure 3C:
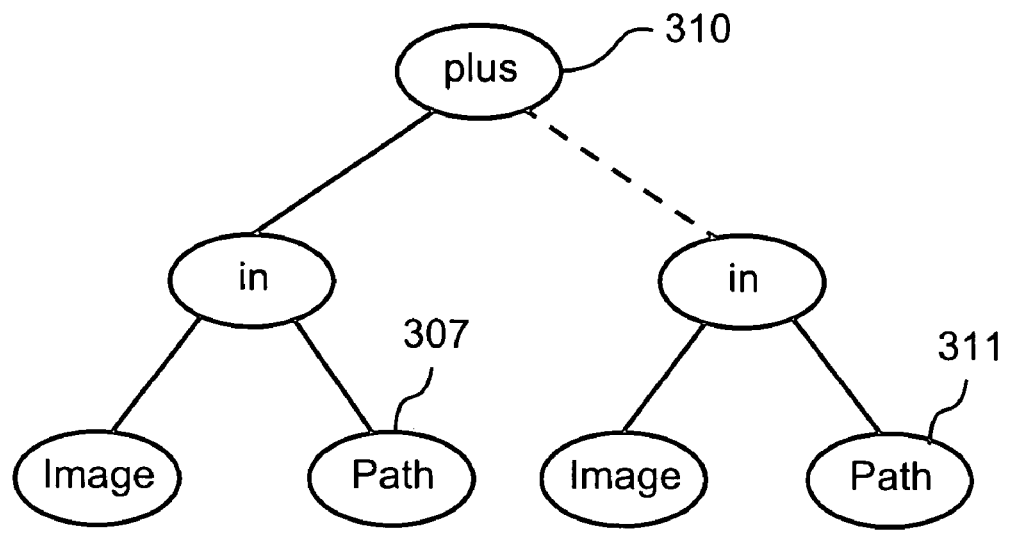
FIG. 3C shows an example of still another video node.
Figure 4A:
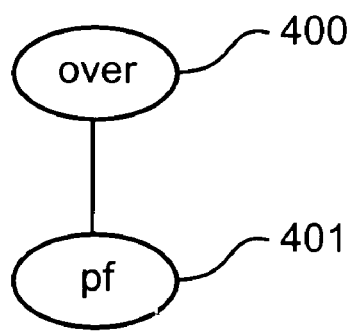
FIG. 4A shows an example of an audio node.
Figure 4B:
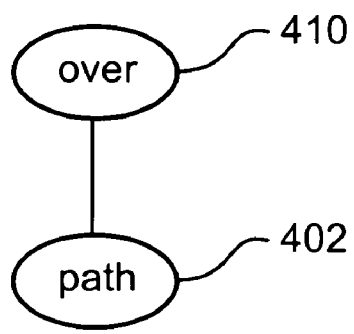
FIG. 4B shows an example of another audio node.

An example of a video node 300 representing a video primitive is shown in FIG. 3A. A further example of a video node 320 representing a video primitive, which is equivalent to the node 300 is shown in FIG. 3B. A still further example of a video node 310 representing a video primitive is shown in FIG. 3C. An example of an audio node 400 representing an audio primitive is shown in FIG. 4A. A further example of an audio node 410 representing an audio primitive is shown in FIG. 4B. The video nodes 300, 310, 320 and the audio nodes 400, 410 are collectively referred to as media nodes and will be described in more detail below. As will be described below, the creation, deletion, seeking, playing, stopping and media attribute modification of the media nodes is executed by the media management code module 120. As described above, the attributes of the media nodes may be changed by altering variables associated with the nodes, for example.

A conventional rendering system operating in a retained-mode provides a set of graphical primitives and a set of operations. Such a rendering system supports the use of each primitive with different operations, such as "path over text" or "image in path" and is required to process all of the possible combinations of primitives and operations. If a new primitive type is introduced, the rendering system has to process a whole new set of primitive-operation combinations. For example, if P represents the number of primitives, O the number of operations and the rendering system complexity without a new primitive is P×P×O, then the rendering system complexity with one new primitive is (P+1)×(P+1)×O. This is a large increase in the complexity of the rendering system.

Rather than using a new primitive type, a composite node (e.g., the composite node 2150) may be used to form a new primitive at an application level. As will be described in more detail below, two image nodes (e.g., the image node 301 as seen in FIG. 3A) each comprising a memory buffer for storing pixel data representing an image associated with the nodes, may be composited with a plane-fill node (e.g., 303) to create a composite node 300. Some primitive type attributes, such as opacity and position, may be stored in memory 806 as variables which are associated with such a composite node to generate a final composite node 300. The final composite node 300 has all of the characteristics of a primitive node and is referred to herein as a video node.

The pixel format widely used for rendering images is RGBA or BGRA. In accordance with such a pixel format, each pixel has a colour component comprising red, green and blue levels (RGB), and an opacity component known as the alpha channel (A). In a conventional retained mode rendering system, in order to change the opacity of an image, the opacity of each pixel of the image has to be changed. However, such a method is inefficient. In a rendering system executing in a retained mode such as the rendering code module 110, when an object A is composited "in" another object B, the opacity of the resultant composite object is determined by multiplying the opacities of each pixel in object B with those of object A. If a plane-fill primitive of uniform opacity is used as object B, and the object A is composited "in" object B, the opacity of the resultant composite object is equivalent to changing the opacity of the object A. Such a method is a much more efficient method of changing the opacity of the object A.

The video node 300 of FIG. 3A is generated by compositing two 'video frames' represented by the nodes 305 and 306 using a "plus" operation. Each of the nodes 305 and 306 represents the result of an image node (e.g., 301) composited with a plane fill node (e.g., 303) as shown in FIG. 3A. The result of the composition of the respective image node and plane fill node associated with each of the nodes 305 and 306 may be stored in one of two memory buffers configured within memory 806, with each of the memory buffers being referenced by one of the nodes 301 and 308, respectively. The compositing operator of the nodes 305 and 306 may be "in" operator or an "out" operator and a path node 307, 311 may be used to construct the video node 300 instead of a plane fill node, as shown in FIG. 3C. Further, as seen in FIG. 3B, a video node 320 may be generated by compositing two video frames represented by the nodes 313 and 315 using an "over" operation. In this instance, each of the nodes 313 and 315 represents the result of an image node (e.g., 317) composited with a path node (e.g., 319) as shown in FIG. 3B.

Each of the image nodes 301 and 308 represents a frame of an input video stream at a certain time associated with the respective node. The source of the input video stream may be a digital video file stored in memory 806 or a live video stream sourced via the communications network 820, for example. Each of the frames associated with each of the nodes 301 and 308 are stored in one of two further memory buffers configured within memory 806 with each of the memory buffers being referenced by each of the nodes 301 and 308, respectively. The opacity of a displayed frame and hence the opacity of the video node 300, may be altered by changing the opacity of the plane fill nodes 303 and 309 or path nodes 307 and 311. Generally, only one of the video frames represented by the nodes 305 and 306 will be active (i.e., currently being displayed on the display 814, for example) at any time. The active video frame will be the frame that represents the correct time in the input video stream. However, when interpolation between two consecutive video frames is required, the video frames represented by the nodes 305 and 306 will be active and each of memory buffers associated with the nodes 305 and 306 will contain one of the two consecutive frames to be interpolated.

Figure 5:
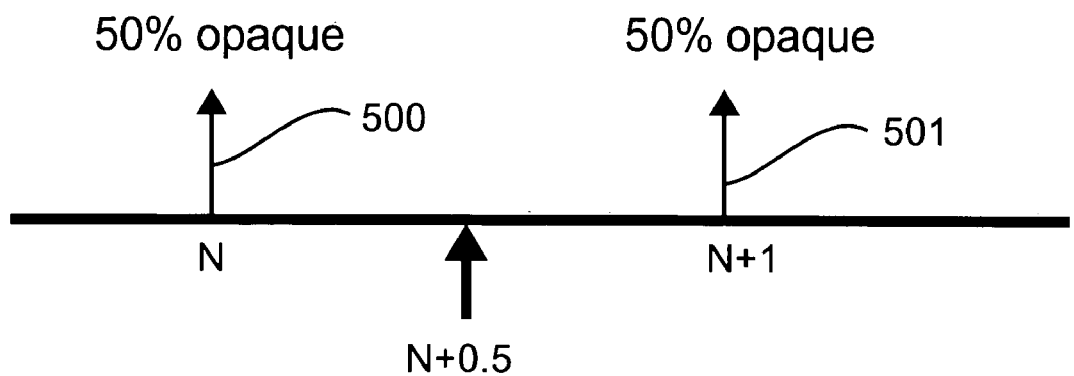
FIG. 5 shows an example of two consecutive frames to be composited with a required frame position halfway between the two consecutive frames.
Figure 6:
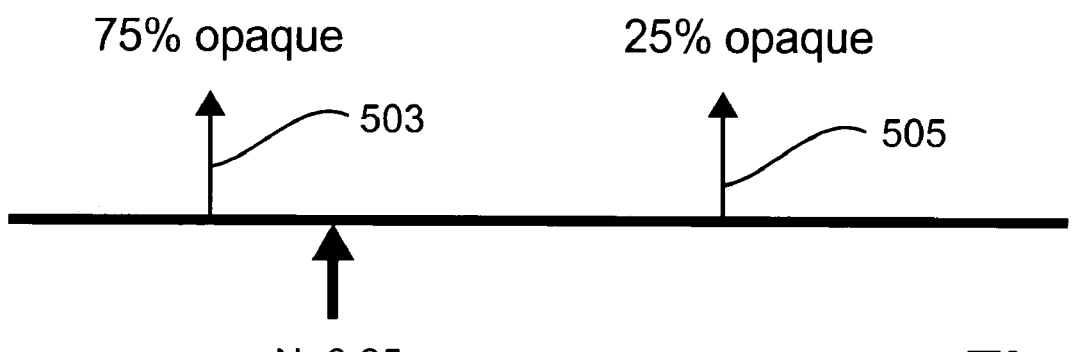
FIG. 6 shows an example of two consecutive frames to be composited with a different required frame position to that of FIG. 5.

The opacity of each plane fill (e.g., 303) or path node (e.g., 307) may be linearly interpolated based on a required frame position between the two consecutive video frames to be interpolated. For example, as shown in FIG. 5, if the frame position of a required frame to be interpolated (i.e., as represented by the arrow marked N+0.5) is half-way between two real consecutive video frames 500 and 501 stored in memory buffers associated with video nodes, the opacities of the frames 500 and 501 will both be set to 50%. As seen in FIG. 6, if the frame position of a required frame to be interpolated (i.e., as represented by the arrow marked N+0.25) is at 0.25 times the interval between two consecutive frames 503 and 505, then the opacity of the first frame 503 will be set to 75% and the opacity of the second frame 505 to 25%. After compositing the two frames (i.e., frames 500 and 501 or frames 503 and 505) with the "plus" operation, a final video frame at 100% opacity is produced.

As described above, video attributes, such as frame rate, length, frame size, corresponding to one or more video frames represented by a video node (e.g., the video node 300) may be stored in memory 806, which is referenced by the video node. Accordingly, a new primitive type may be added to the compositing tree 2100 without increasing the complexity of a corresponding rendering system such as the rendering code module 110. A method 1600 of creating a video node will be described below with reference to FIG. 16.

An audio node 400 as described herein is a single composition of a plane fill node 401, as shown in FIG. 4A. A further example of an audio node 410 is a single composition of a path node 402, as shown in FIG. 4B. The audio nodes 400 and 410 reference information regarding an audio sample such as sampling rate, bit rate, length, and quality. Such information may be stored in memory 806 and may be referenced by a respective node 400, 410. The audio nodes 400 and 410 may also each have a memory buffer associated with the nodes 400 and 410. These memory buffers may be used to store audio samples associated with each of the nodes 400 and 410.

Figure 2:
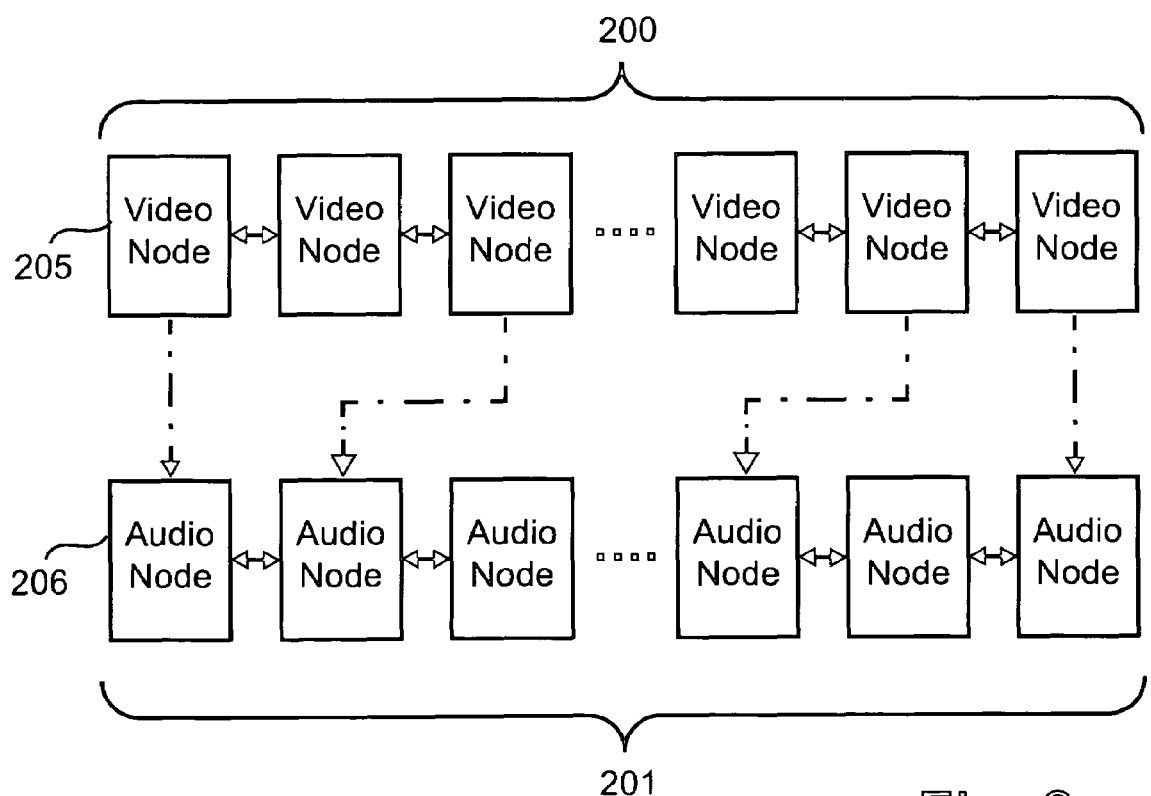
FIG. 2 shows a representation of a plurality of video and audio lists.

The media management code module 120 maintains two lists, a video node list 200 comprising a plurality of video nodes (e.g., the video node 205) and an audio node list 201 comprising a plurality of audio nodes (e.g., the audio node 206), as shown in FIG. 2. As shown in FIG. 2, the video node 205 is linked with the audio node 206, as represented by an arrow. Video and audio nodes of a compositing tree, such as the compositing tree 2100, are added to a respective one of the lists 200 or 201 when the nodes are created. Such video and audio nodes are removed from a respective one of the lists 200 or 201 when the nodes are deleted. The link between a video node and an associated audio node (e.g., the link between the video node 205 and the audio node 206) is maintained to ensure that any operation, such as setting a current frame position, is applied to both the video node and associated audio node.

When a video node switches between play mode and stop mode, the media management code module 120 changes the mode of an associated audio node linked with the particular video node, if any. If a video node is deleted, the media management code module 120 also deletes the associated audio node.

A method 700 of rendering images will now be described with reference to FIG. 7. The method 700 is preferably implemented as software resident within the hard disk drive 810 and being controlled in its execution by the processor 805. The method 700 may be executed by the rendering code module 110. The method 700 begins at step 710, where the processor 805 generates a compositing tree (e.g., the compositing tree 2100). The generated compositing tree may comprise video nodes (e.g., 300) and non-video nodes (e.g., path nodes). An image represented by the generated compositing tree may be stored in a memory buffer configured within memory 806 and being referenced by a root node of the compositing tree. The image may also be rendered on the display screen 814, for example. At the next step 720, attributes (e.g., opacity, position) of the generated compositing tree are initialised and one or more video nodes are set to play by setting variables associated with the video nodes. Therefore, a series of video images represented by the video nodes of the generated compositing tree may be rendered on the display screen 814. Then at the next step 730, the processor 805 updates the generated compositing tree. A method 900 of updating the compositing tree, as executed at step 730, will be described below with reference to FIG. 9. The method 900 updates the generated compositing tree including media primitives (i.e., video and audio primitives) of the compositing tree. The method 700 continues at the next step 740, where the compositing tree is modified. For example, the structure of the generated compositing tree or attributes of the compositing tree may be modified in order to change the image represented by the compositing tree and therefore, the rendered image associated with the root node of the compositing tree. At the next step 750, if the modification of the generated compositing tree is completed then the method 700 concludes. Otherwise, the method 700 returns to step 730.

Figure 9:
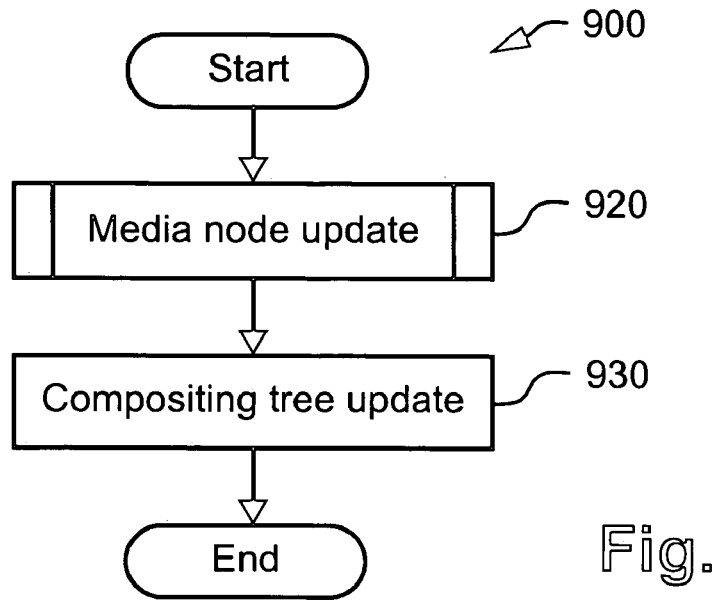
FIG. 9 is a flow diagram showing a method of updating a compositing tree.

A method 900 of updating the compositing tree, as executed at step 730, will now be described with reference to FIG. 9. The method 900 is preferably implemented as software resident within the hard disk drive 810 and being controlled in its execution by the processor 805. As described above, the method 900 updates a compositing tree including media primitives (i.e., video and audio primitives) of the compositing tree. The method 900 begins at step 920 where the processor 805 updates any media nodes (i.e., video and audio nodes) of the generated compositing tree. A method 1000 of updating media nodes, as executed at step 920 will be described below with reference to FIG. 10. As will be explained in further detail below, the method 1000 is executed by the media management code module 120.

Following step 920, the method 900 continues at step 930 where the compositing tree generated at step 710 is updated by the rendering code module 110. The method 900 concludes after step 920.

Figure 10:
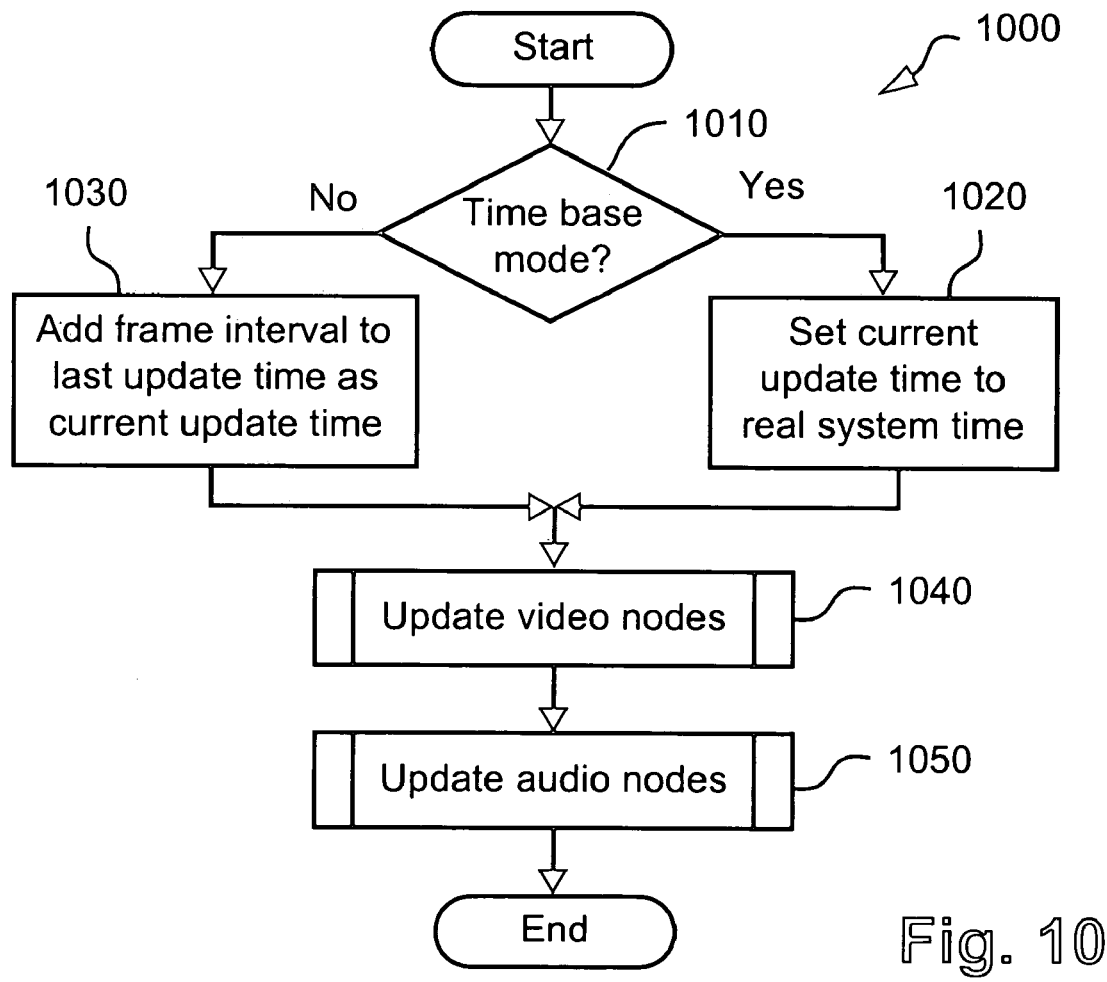
FIG. 10 is a flow diagram showing a method of updating media nodes (i.e., video and audio nodes)

The method 1000 of updating media nodes (i.e., video and audio nodes), as executed at step 920 will now be described with reference to FIG. 10. The method 1000 may be implemented as software resident on the hard disk drive 810 and being controlled in its execution by the processor 805.

The method 1000 begins at step 1010, where if the processor 805 determines that the rendering code module 110 is executing in a time base mode, then the method 1000 proceeds to step 1020. Otherwise the rendering code module 110 is running in a frame base mode and the method 1000 proceeds to step 1030. At step 1020, the processor 805 sets an update time to the current time of a system clock (not shown) of the computer module 801.

At step 1030, the update time is set to the time of a next frame, since the rendering code module 110 is running in a frame based mode, to generate a current update time. At step 1030, the update time is set by adding the interval between a current frame and a next frame (i.e., the frame interval) to the previous update time to form the current update time. The current update time is used during the updating of the media nodes of the compositing tree and is applied to every media node regardless of actual time taken to perform the update of a particular node. At the next step 1040, the video nodes of the compositing tree are updated. A method 1100 of updating video nodes will be described below with reference to FIG. 11. Then at the next step 1050, the audio nodes of the compositing tree are updated and the method 1000 concludes. A method 1200 of updating audio nodes will be described below with reference to FIG. 12.

Figure 11:
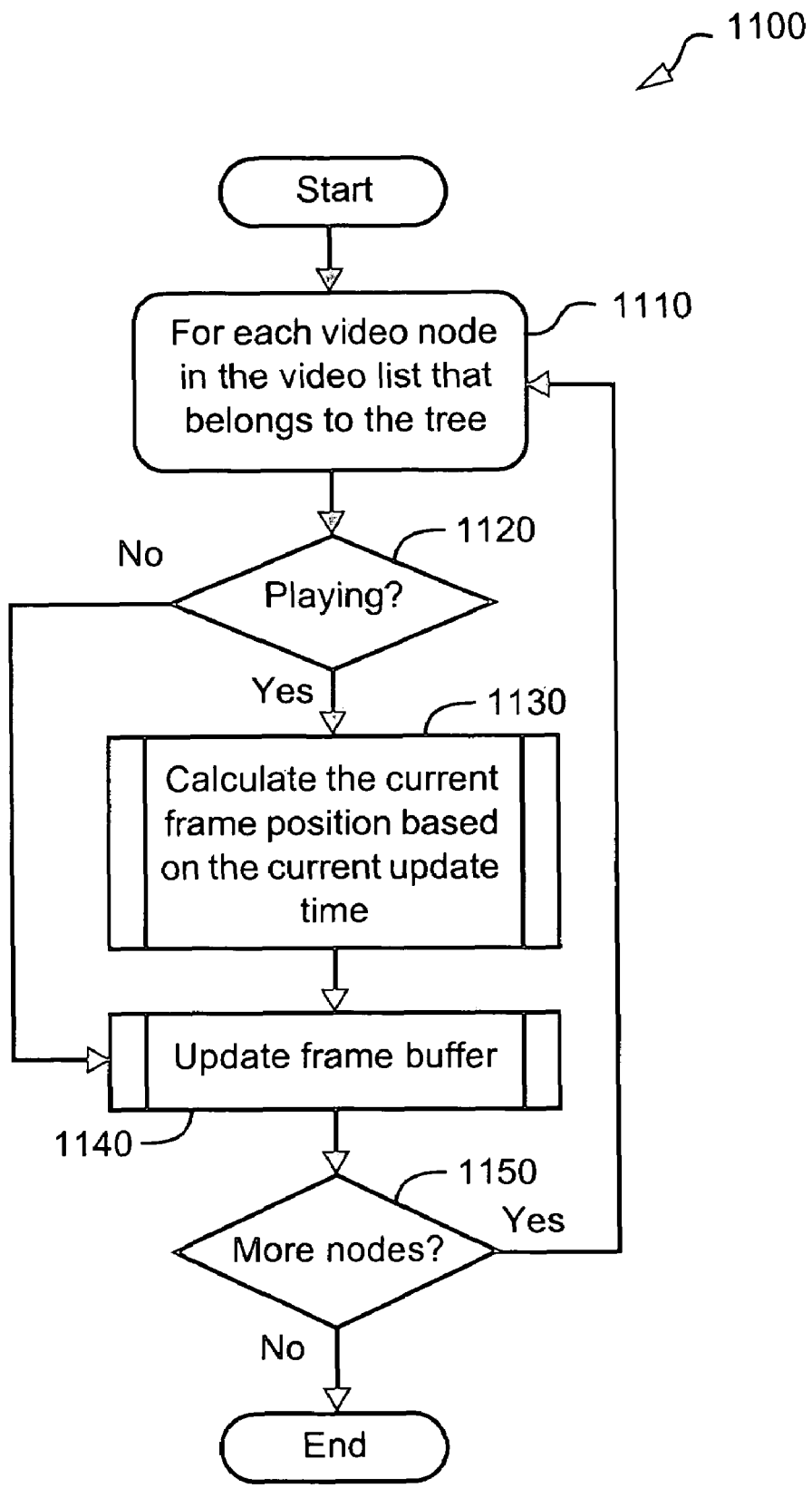
FIG. 11 is a flow diagram showing a method of updating video nodes.

The method 1100 of updating video nodes will now be described below with reference to FIG. 11. The method 1100 may be implemented as software resident on the hard disk drive 810 and being controlled in its execution by the processor 805. During the updating of video nodes, the media management code module 120 processes a video node list (e.g., the video node list 200) configured within memory 806. The video node list comprises all of the video nodes in the compositing tree.

The method 1100 begins at the first step 1110, where the processor 805 accesses the video node list stored in memory 806 for the compositing tree and selects a first video node (i.e., a current node) that is present in the compositing tree. At the next step 1120, if the processor 805 determines that the current node is in play mode, then the method 1100 proceeds to step 1130 where a new frame position for the video node is determined based on the current update time and a first update time. Otherwise, if the current video node is stopped (i.e., not in play mode) then the method 1100 proceeds directly to step 1140. A method 1300 of determining a new frame position for a video node will be described below with reference to FIG. 13. At step 1140, irrespective of whether the video node is playing or stopped, a video frame associated with the current video node is updated. That is, the memory buffer associated with the current video node is updated by rendering a further frame into the memory buffer. The video frame is decompressed at step 1140, if necessary. A method 1800 of updating a video frame as executed at step 1140 will be described below with reference to FIG. 18. In accordance with the method 1800, the processor 805 updates frames associated with specified video nodes of the compositing tree. The method 1100 continues at the next step 1150 where if the processor 805 determines that there are more video nodes of the video node list to be updated, then the method 1800 returns to step 1110. Otherwise, the method 1100 concludes.

One method of determining whether a particular video node is present in a given compositing tree, as at step 1110 of the method 1100, is to traverse the entire compositing tree from the root of the compositing tree down to the leaf nodes. However, such a method is inefficient. Typically, the proportion of video nodes in a compositing tree is small compared to the total number of nodes in the compositing tree. Therefore, rather than potentially searching through an entire compositing tree, the media management code module 120 may retrieve the root of each video node by traversing up through ancestors of the video node. The root of the particular video node may then be compared against the root of a particular compositing tree. If the compared nodes are in fact the same node, the particular video node is present in the particular compositing tree.

After all video nodes of the compositing tree have been processed in accordance with the method 1100, the audio nodes of the compositing tree are processed in accordance with the method 1200. Again, all of the audio nodes of the compositing tree are contained in an audio node list configured within memory 806. The method 1200 of updating audio nodes may be implemented as software being resident in the hard disk drive 810 and being controlled in its execution by the processor 805. The method 1200 may be implemented as one or more code modules of the media management code module 120. The media management code module 120 updates the current position of each audio node that is in play mode and may decompress an audio node if necessary.

The encoder/decoder code module 130 maintains a set of codecs that may be used to encode or decode various video and audio formats. The codecs are loaded into memory buffers configured within memory 806 on request of the encoder/decoder code module 130 and are retained in these memory buffers for later use. The codecs are placed into a decoder list or encoder list, configured in memory 806, as appropriate. The decoder or encoder lists are ordered such that a last codec to be loaded into a particular list will be the first codec to be used during processing (i.e., last-in/first-out). Such a last-in/first-out ordering allows the encoder/decoder code module 130 to override priority of previously-loaded codecs.

When a codec is required for loading and playing video and/or audio, for example, the encoder/decoder code module 130 attempts to open a requested video and/or audio file corresponding to the video and/or audio to be played using the first codec in the decoder list (i.e., the last codec to be loaded into the decoder list). If successful, the first codec in the decoder list may be associated with a media node (i.e., video node or audio node) that is created for the video and/or audio to be played. The media node uses the same codec until the node is deleted, even if a new codec is loaded after the media node was created. If the codec failed to open the corresponding video and/or audio file, the encoder/decoder code module 130 tries a next codec in the decoder list and so on until the decoder list is exhausted. In the event that no codec is able to open the corresponding video and/or audio file, the encoder/decoder code module 130 reports the failure to load the video and/or audio to be played.

When a codec is required for outputting video images (e.g., to a video file on hard disk 810), the encoder/decoder code module 130 attempts to initialise the requested video to be output using a first codec in the encoder list (i.e. the last codec to be loaded). If successful, the first codec in the encoder list may be used for the video to be output. If the first codec in the encoder list cannot be used, the encoder/decoder code module 130 tries a next encoder codec in the encoder list until all codecs in the encoder list have been tried. In the event that no codec in the encoder list can be used for the video to be output, the encoder/decoder code module 130 reports the failure.

Figure 16:
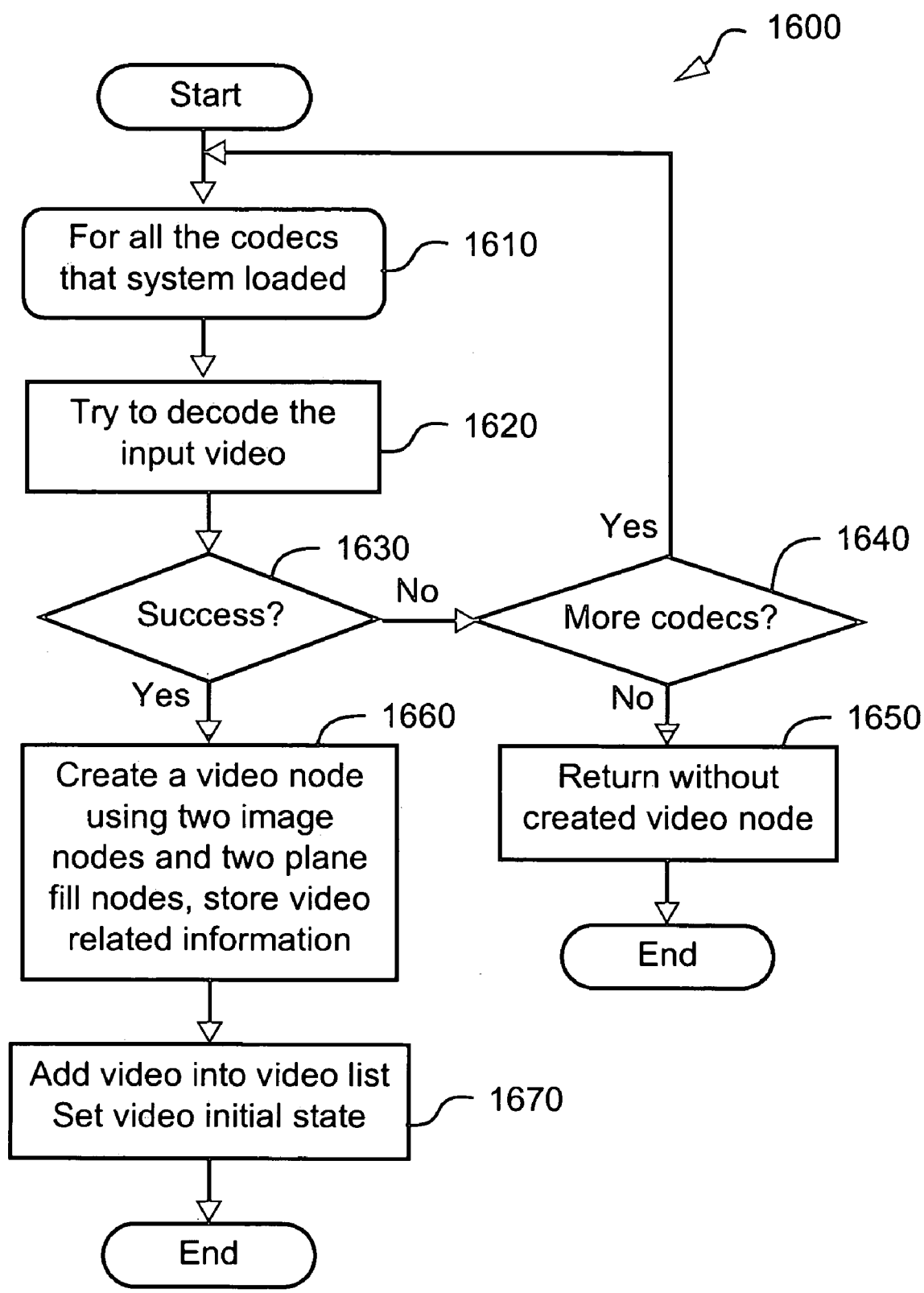
FIG. 16 is a flow diagram showing a method of creating a video node.

The method 1600 of creating a video node will now be described with reference to FIG. 16. The video node is created from a given video file representing an input video frames. The video file may be stored in memory 806. The method 1600 may be implemented as software resident in the hard disk drive 810 and being controlled in its execution by the processor 805. The method 1600 may be implemented as one or more code modules of the media management code module 120.

The method 1600 begins at the first step 1610, where the processor 805 selects a first codec in the decoder list. At the next step 1620, the processor 805 attempts to open the video file using the selected codec. At the next step 1630, if the video file was successfully decoded then the method 1600 proceeds to step 1660. Otherwise, the method 1600 proceeds to step 1640. At step 1640, if the processor 805 determines that there are more codecs in the decoder list then the method 1600 returns to step 1610. Otherwise, the method 1600 proceeds to step 1650 where the processor 805 generates a message indicating that the video node creation has failed and the method 1600 concludes.

The method 1600 continues at step 1660, where after successful opening of the video file, the processor 805 creates two image nodes (e.g., 301 and 308) and two plane-fill nodes (e.g., 303 and 309). The processor 805 then composites each image node with one of the plane-fill nodes using an "in" operation. The processor 805 then composites the two composite nodes with a "plus" operation. No image data is yet assigned to each image node created at step 1660. That is, memory buffers configured within memory 806 and being referenced by the respective image nodes do not have any images stored within them. However, image data will be assigned to the image nodes and stored in these memory buffers when the compositing tree comprising the image nodes is updated at update time as will be described below with reference to FIG. 18. The composite node resulting from the compositing of the two image nodes with each of the respective plane-fill nodes now resembles the video node 300, as shown in FIG. 3A. The details of the video file used to create the video node at step 1660 are stored in memory 806 and are referenced by the created video node. These details include video length, frame rate, video size, codec used, compression type etc.

The method 1600 continues at the next step 1670, where the video node created at step 1660 is added to a video node list and the method 1600 concludes. The video node list is configured within memory 806. Also at step 1670, the video node is initialised. In initialising the video node, the video node is set to the frame rate of the video file used to create the video node, the start point of the video node is set to the beginning (i.e., the start time) of the play range, the video node is set to stop mode and the opacity of the video node is set to opaque. The video node created at step 1660 may be returned to an application that requested the creation of the video node, for example.

Figure 20:
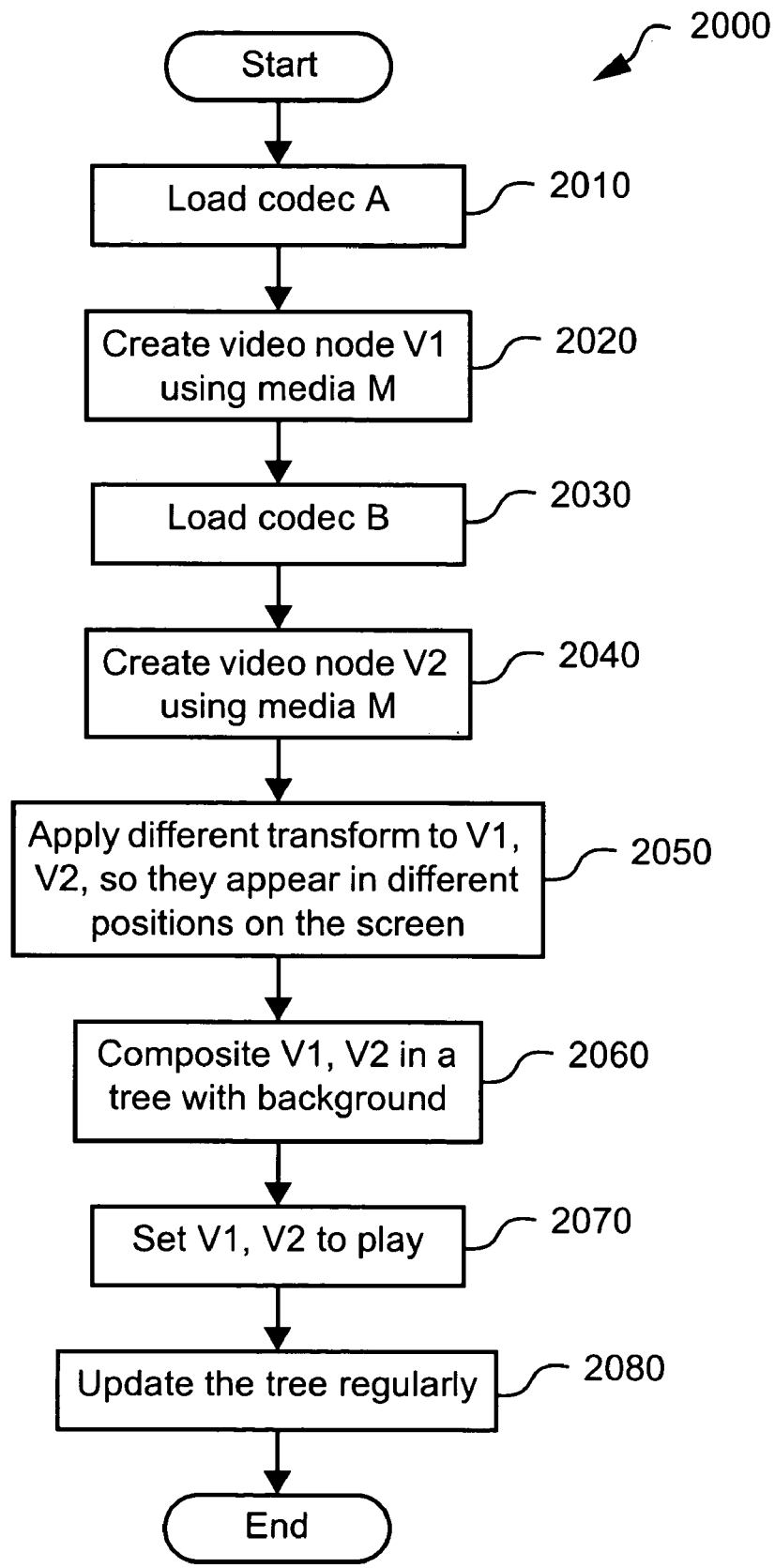
FIG. 20 is a flow diagram showing a method of creating video nodes using different codecs.

A method 2000 of creating a video node using different codecs will now be described with reference to FIG. 20. In the method 2000, the different codecs are used to open the same video file. The method 2000 may be implemented as software resident on the hard disk drive 810 and being controlled in its execution by the processor 805. The method 2000 will be described by way of an example in which two codecs (i.e., codecs A and B) are used to process input media M (e.g., a video file). In the example, codec A has better colour restoration than codec B but codec B has better image detail restoration than codec A.

The method 2000 begins at step 2010, where codec A is loaded into a decoding list configured within memory 806. At the next step 2020, a video node V1 representing the input media M is created using codec A. One or more frames of the input media M are stored in a memory buffer configured within memory 806 and being referenced by the video node V1. The video node is created at step 2020 in accordance with the method 1600. Then at step 2030, codec B is loaded into the decoding list configured within memory 806. Since the codecs are used in last-in/first-out order, codec B now has a higher priority than codec A. At step 2040, a video node V2 representing the same media M is created using the codec B instead of the codec A to open the input media M The video node is created at step 2040 in accordance with the method 1600. Again, one or more frames of the input media M may be stored in a memory buffer configured within memory 806 and being referenced by the video node V2. Then at the next step 2050, different transform matrices are applied to video node V1 and video node V2, so that the video frames associated with each of the nodes (i.e., the video frames stored in the two memory buffers associated with a respective one of the video nodes V1 and V2) will appear at different positions on a rendering target such as the display screen 814.

The method 2000 continues at the next step 2070, where the video nodes are composited with a background image using the rendering code module 110. The video nodes V1 and V2 are then set to the play mode by altering an attribute associated with the video nodes V1 and V2. If the compositing tree comprising the video nodes V1 and V2 is then regularly updated at the next step 2080, two versions of the same video input will play on the display screen 814 at different positions. However, the output of video node V1 will have better colour quality than the output of video node V2, and the output of video node V2 will have better image quality than the output of video node V1, due to the differing codecs used for each.

Figure 12:
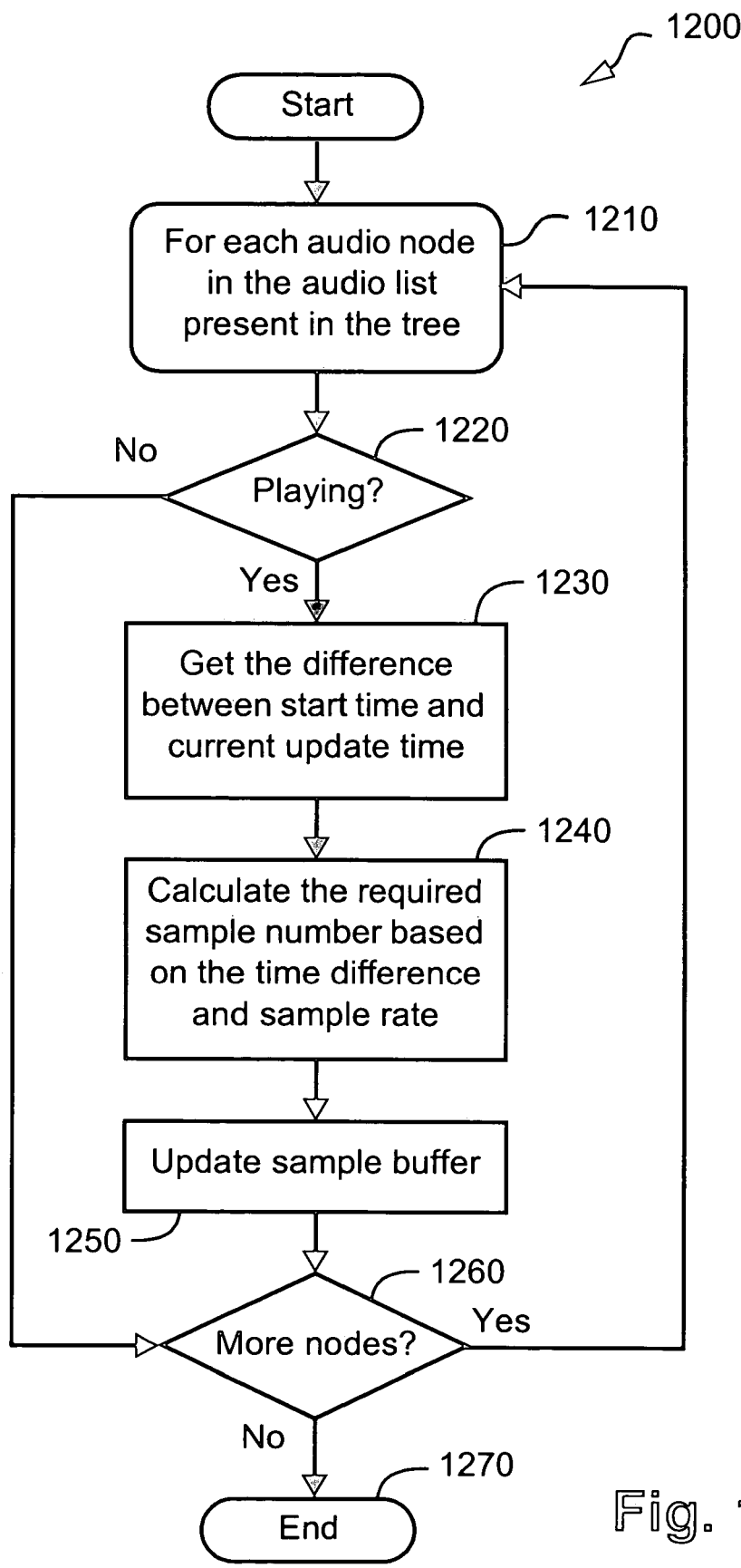
FIG. 12 is a flow diagram showing a method of updating audio nodes.

The method 1200 of updating audio nodes will now be described with reference to FIG. 12. As described above, all of the audio nodes of the compositing tree being processed (i.e., the compositing tree created at step 710) are contained in an audio node list configured within memory 806. The method 1200 begins at step 1210, where the processor 805 selects a first audio node (i.e., a current audio node) of the audio node list that is present in the compositing tree. At the next step 1220, if the processor 805 determines that the current audio node is in play mode, then the method 1200 proceeds to step 1230. Otherwise, if the current audio node is in stop mode, then the method 1200 proceeds to step 1260. Again, the current audio node may be configured in one of either play mode or stop mode by altering an attribute associated with the audio node. Next, the processor 805 determines a new sample number for the current audio node based on the current update time determined at step 1030 or step 1020. The new time position is determined in a similar manner to the method 1300 of determining a new frame position for the video node, which will be described below. The time difference between the current update time and the start time of the audio node is determined at step 1230. Then a new sample number is determined at step 1240 by multiplying the determined time difference by the audio sample rate and the playback rate. The method 1200 continues at the next step 1250, where the processor 805 updates a sample buffer configured within memory 806 and being associated with the current audio node. The sample buffer is updated with an audio sample that represents the new audio sample number determined at step 1240. At step 1260, if there are any more audio nodes in the audio list to be processed, then the method 1200 returns to step 1210. Otherwise, the method 1200 concludes.

Figure 13:
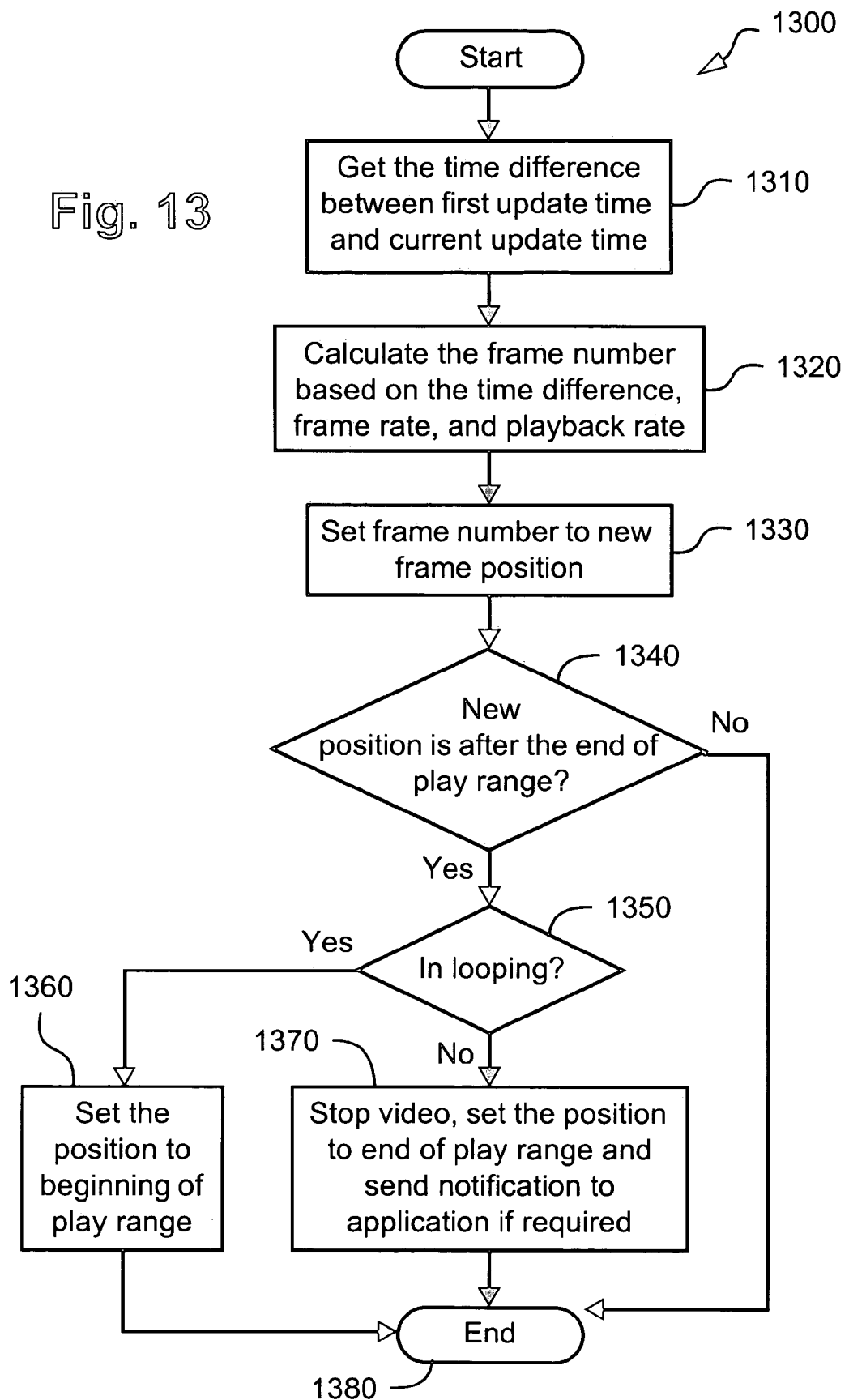
FIG. 13 is a flow diagram showing a method of determining a new frame position for a video node.

The method 1300 of determining a new frame position for a video node, as executed at step 1130 of the method 1100, will be described below with reference to FIG. 13. The method 1300 may be implemented as software resident on the hard disk drive 810 and being controlled in its execution by the processor 805. The method 1300 begins at step 1310, where the processor 805 determines a time difference representing the time between a current frame update time of the video node and the time of a first frame update (i.e., the 'start time'). At the next step 1320, the processor 805 determines a frame number for the current video node based on time difference determined at step 1310 as follows:

$$\text{New frame number} = (\text{current time} - \text{start time}) \times \text{video frame rate} \times \text{playback rate}$$

where 'video frame rate' refers to the original frame rate (in frames per second) of the video stream being input to the memory buffer associated with the current video node and the 'playback rate' indicates the speed ratio relative to the original frame rate. For example, if the playback rate is equal to two then video stream is playing at twice the original frame rate.

At the next step 1330, the frame number determined at step 1320 is stored in memory 806 as the new frame position. Then at the next step 1340, if the processor 805 determines that the new frame position has reached or surpassed the end of a predetermined play range, then the method 1300 proceeds to step 1350. Otherwise the method 1300 concludes. At step 1350, the processor 805 determines whether or not the video stream associated with the current video node should loop (i.e., be replayed). If the video stream associated with the current video node is looping then the method 1300 proceeds to step 1360. Otherwise, if the video stream associated with the video node is not looping or a prescribed number of loops have been played, then the method 1300 proceeds to step 1370. At step 1360, the frame position of the video stream of the current video node is reset to the beginning (i.e., the start time) of the play range and the video stream will continue playing as per usual from the start time. At step 1370, the frame position of the video stream associated with the current video node is set to the end of the play range. The processor 805 may also generate a notification to indicate that playback has finished.

Figure 18:
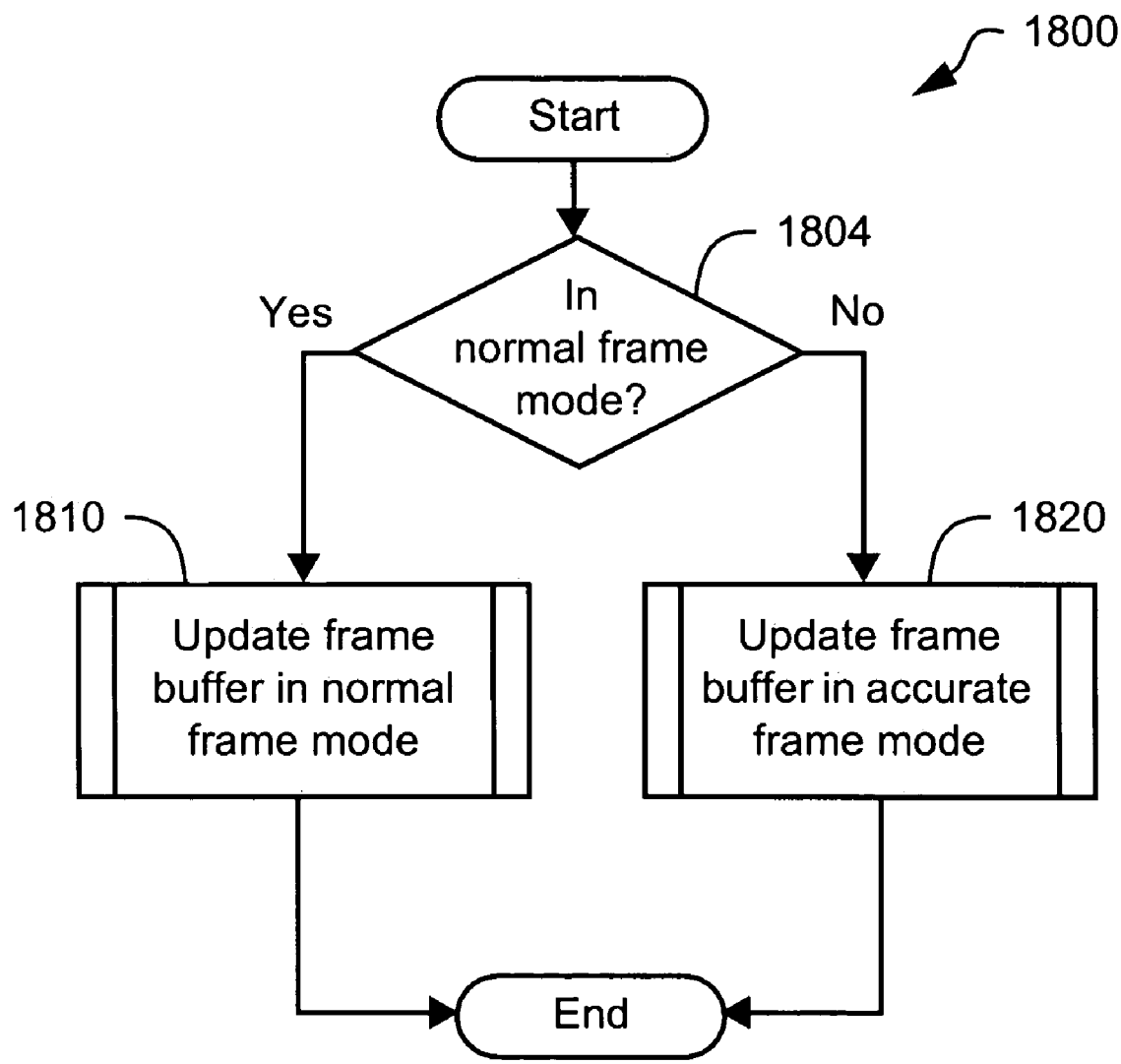
FIG. 18 is a flow diagram showing a method of updating a video frame.

The method 1800 of updating a video frame, as executed at step 1140, will now be described with reference to FIG. 18. The method 1800 is preferably implemented as software resident in the hard disk drive 810 and being controlled in its execution by the processor 805. The method 1800 updates a video frame stored in a memory buffer configured within memory 806 and being referenced by a current video node. The method begins at step 1804, where if the processor 805 determines that the media management code module 120 is executing in a normal frame mode then the method 1800 proceeds to step 1810. Otherwise, the media management module 120 is in accurate frame mode and the method 1800 proceeds to step 1820. At step 1810, the processor 805 updates the video frame in the frame buffer associated with the current video node in normal mode. A method 1400 of updating a video frame associated with a video node in normal mode will be explained below with reference to FIG. 14. At step 1820, the processor 805 updates the video frame in the frame buffer associated with the current video node in accurate mode. A method 1500 of updating the video frame in accurate mode will be described below with reference to FIG. 15. Following either of steps 1810 or 1820, the method 1800 concludes.

Figure 14:
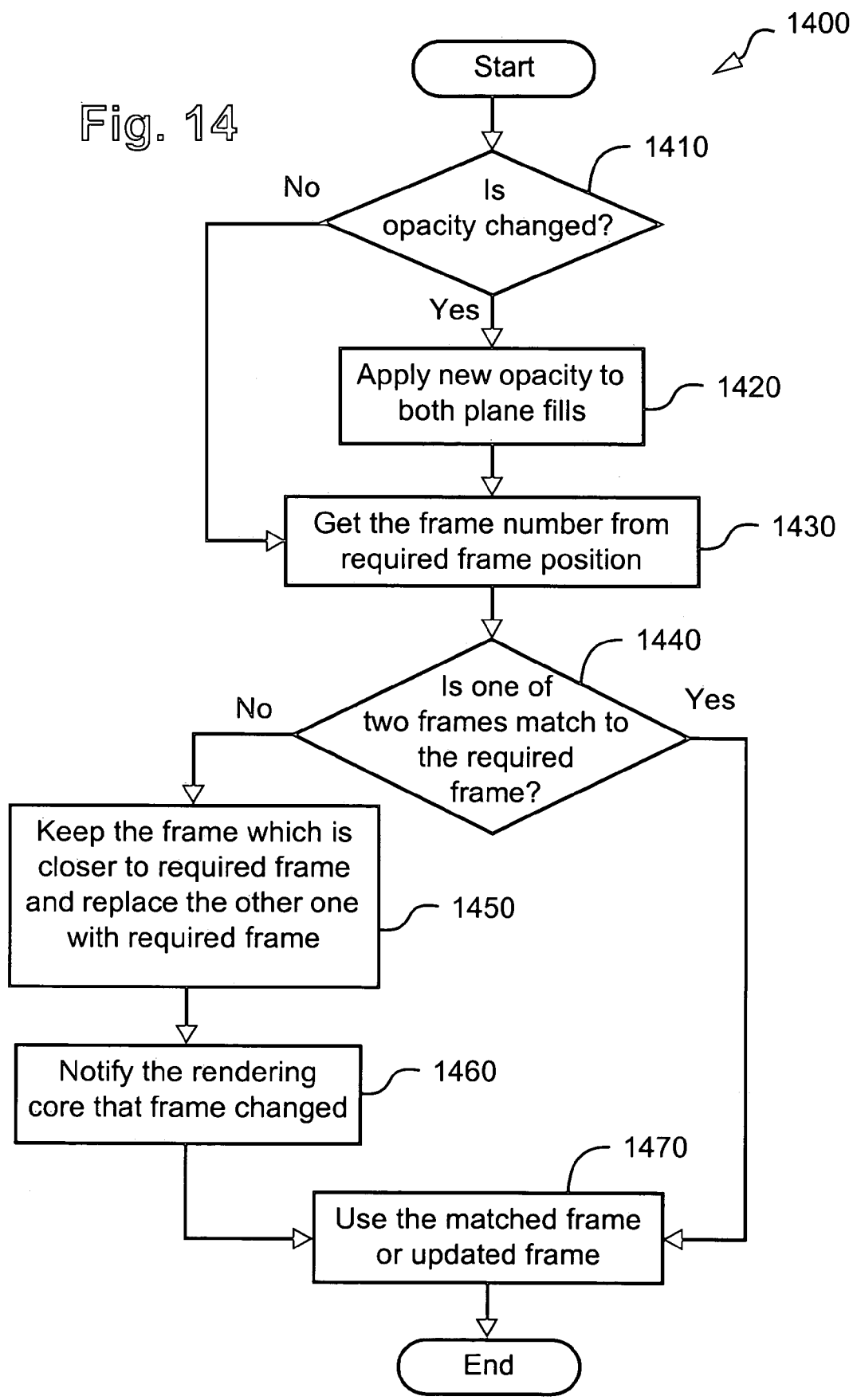
FIG. 14 is a flow diagram showing a method of updating a video frame in normal frame mode.

The method 1400 of updating a video frame associated with a video node in normal mode will now be described with reference to FIG. 14. The method 1400 is preferably implemented as software resident in the hard disk drive 810 and being controlled in its execution by the processor 805. The method 1400 begins at step 1410, where if the processor 805 determines that the opacity of the current video node has changed since the video node was last updated then the method 1400 proceeds to step 1420. Otherwise, the method 1400 proceeds to step 1430. The processor 805 determines the opacity of the current video node at step 1410 based on an attribute associated with the current video node. At step 1420, the new opacity is applied to both plane-fill nodes (e.g., the plane fill nodes 303 and 309) associated with the current video node. At the next step 1430, a required frame number for the current update of the video node is determined from a previously stored required frame position. The required frame number determined at step 1430 corresponds to the frame position saved at step 1330 of the method 1300. Since the required frame position may not necessarily be an integer (whole) number, the required frame number determined at step 1430 is set to the closest frame at or before the required frame position, as shown below:

$$\text{Required frame number} = \lfloor \text{required frame position} \rfloor$$

where $\lfloor \; \rfloor$ represents a floor operator.

At the next step 1440, if the processor 805 determines that the frame corresponding to the required frame number is stored in either one of the two image buffers associated with the image nodes (e.g., 301 and 308) of the current video node to be updated, then the method 1400 proceeds to step 1470. Otherwise, the method 1400 proceeds to step 1450.

At step 1450, one of the image buffers associated with the image nodes of the current video node is updated with the frame corresponding to the required frame number. The image node image buffer containing a frame that is furthest from the required frame corresponding to the required frame number is updated at step 1450, in case a next update uses the image node image buffer comprising a frame that is closer to the required frame. The method 1400 continues at the next step 1460 where the processor 805 notifies the rendering code module 110 that the frame to be rendered has changed so that the rendering code module 110 will update the rendered frame. The method 1400 concludes at the next step 1470, where an activity property of the current video node is used to enable a frame stored in one image node's image buffer associated with the current video node and to disable the frame stored in the other image node's image buffer in order to choose the appropriate image node containing the required frame.

Figure 15:
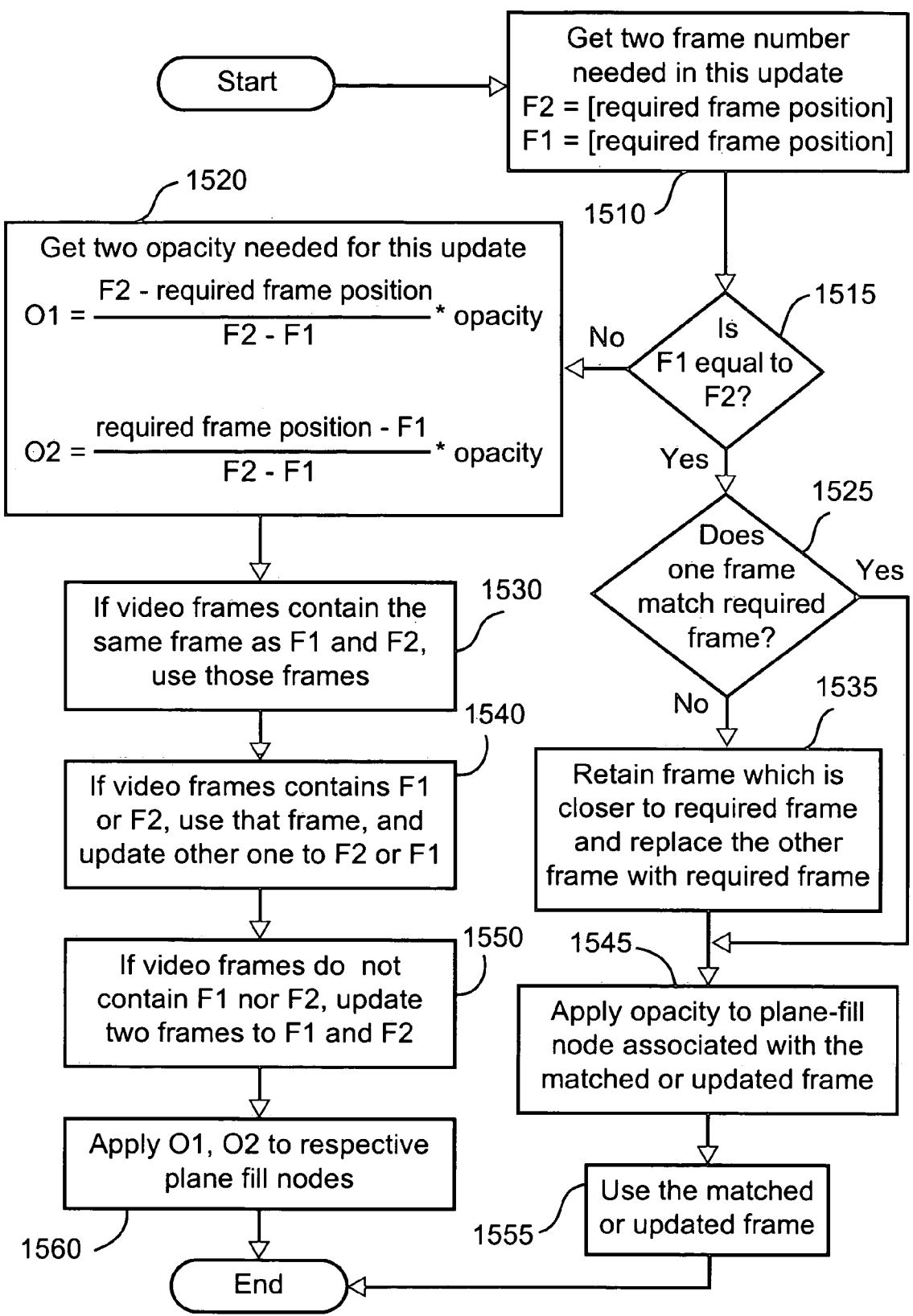
FIG. 15 is a flow diagram showing a method of updating a video frame in accurate mode.

The method 1500 of updating a video frame in accurate mode, as executed at step 1810, will now be described below with reference to FIG. 15. The method 1500 may be implemented as software resident in the hard disk drive 810 and being controlled in its execution by the processor 805. In accurate frame mode, two frames closest to the required frame number are used with differing opacities to produce a final frame for rendering on the display screen 814, for example. The method 1500 begins at step 1510, where the processor 805 determines two frame numbers F1, F2 required for updating the video frame as follows:

F1=⌊required frame position⌋

F2=⌈required frame position⌉ where ⌈ ⌉ represents a ceiling operator.

At the next step 1515, if F1 is equal to F2 then the method 1500 proceeds to step 1525. Otherwise, the method 1500 proceeds to step 1520, where two opacities O1 and O2 that will be applied to the frames F1 and F2 are determined as follows:

$$O1 = \frac{F2 - \text{required frame position}}{F2 - F1} \times \text{Opacity}$$

$$O2 = \frac{\text{Required frame position} - F1}{F2 - F1} \times \text{Opacity}$$

where the 'opacity' value represents the opacity of the current video node in both cases. The opacity of the current video node is determined by an attribute associated with the video node, as at step 1410 of the method 1400. The opacities O1 and O2 determined at step 1520, are only applicable for a video node using a plus operator as in FIG. 3A. When an "over" operator is used as in the video node 320 of FIG. 3B, the opacity O2 applied to the frame F2 will be equal to the opacity represented by the attribute associated with the video node (i.e., O2=opacity).

At the next step 1530, the existing contents of the image node image buffers associated with the current video node are analysed to determine if the image node image buffers already contain frames matching the frames represented by F1 and F2. If the image node image buffers already contain frames matching the frames F1 and F2, then no changes are required to be made to the image node image buffers at step 1530. If one of the image node image buffers does not contain a frame matching either one of the frames F1 and F2, then the image node image buffer not containing the frame is updated the appropriate missing frame F1 or F2, at the next step 1540. Then at the next step 1550, if both of the image node image buffers associated with the image buffers of the current video node do not contain frames matching either one of the frames F1 and F2, then both of image node image buffers are updated so that one of the image node image buffers is updated to contain the frame F1 and the other image node image buffer is updated to contain the frame F2.

The method 1500 concludes at the next step 1560, where the opacities O1 and O2 detemined at step 1520 are applied to the plane-fill nodes composited with the image nodes associated with the image buffers comprising the frames F1 and F2. The opacity O1 is applied to the plane-fill node composited with the image node associated with the image buffer comprising the frame F1. Further, the opacity O2 is applied to the plane-fill node composited with the image node associated with the image buffer comprising the frame F2.

As described above, if F1 is equal to F2 then the method 1500 proceeds to step 1525. At step 1525, the existing contents of the image node image buffers associated with the current video node are analysed and if either one of the image node image buffers already contain a frame matching the required frame number, then the method 1500 proceeds directly to step 1545. Otherwise, the method 1500 proceeds to step 1535. At step 1535, the frame that is closer to the frame matching the required frame number is retained in the corresponding image node image buffer and the other frame is replaced by the frame matching the required frame number. The method 1300 concludes at the next step 1545, where the opacity of the video node (i.e., the opacity attribute associated with the video node) is applied to the plane-fill node composited with the image node associated with the image node buffer containing either the frame matching the required frame number, or the updated frame containing the frame F1. The method 1500 concludes at step 1555, Where an activity property of the current video node is used to enable the frame stored in the node's image buffer containing the required frame, and disable the frame stored in the other image buffer.

Figure 17:
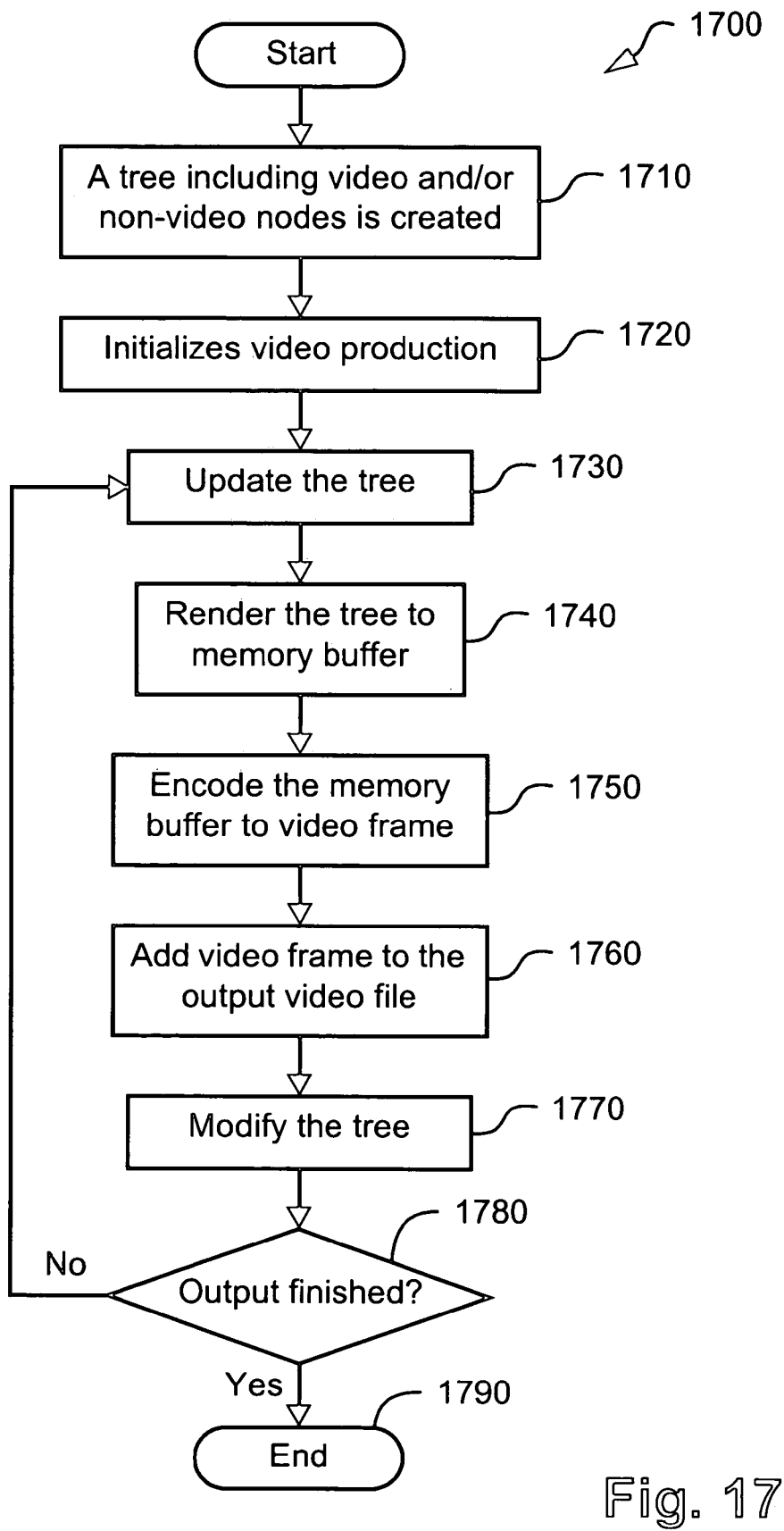
FIG. 17 is a flow diagram showing a method of creating a video file.

A method 1700 of creating a video file will now be described with reference to FIG. 17. The method 1700 may be implemented as software resident in the hard disk drive 810 and being controlled in its execution by the processor 805. The method 1700 begins at the first step 1710, where a compositing tree (e.g., the tree 2100) comprising video and/or non-video nodes (e.g., audio nodes) is created. At the next step 1720, the processor 805 identifies a region of the image represented by the compositing tree. The identified region is used in creating the video file. The area of the region identified therefore determines the size of each frame in the created video file. The method 1700 continues at the next step 1730 where the media nodes (i.e., video and/or audio nodes) and/or non-media nodes (i.e., text, path nodes) of the compositing tree created at step 1710 are updated to reflect any changes (e.g., any further video frames added to a frame buffer of a video node or a transform of a path node). The media nodes are updated at step 1730 according to the method 1000. At the next step 1740, the region of the image identified at step 1720 is rendered to a memory buffer configured within memory 806. Then at the next step 1750, the encoder/decoder code module 130 is executed by the processor 805 to encode the data in the memory buffer to a single video frame in a particular format. The format may be specified by an application program, for example. At the next step 1760, the encoded video frame is appended to the end of the video file created at step 1720. The method 1700 continues at the next step 1770 where the compositing tree is modified to reflect any changes to the encoded video frame so that a following output video frame differs from the encoded video frame (i.e., the previous frame). At the next step 1780, if the processor 805 determines that there are further video frames to be added to the video file, then the method 1700 returns to step 1730. Otherwise, the method 1700 concludes and the video file created at step 1720 is closed.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive.

The invention claimed is:

1. A method of rendering an image, said image being formed by compositing one or more graphical primitives according to a compositing tree, said compositing tree comprising a plurality of nodes each representing a graphical primitive of said image or an operation for combining said graphical primitives, said method comprising the steps of:

representing at least one video frame of a video sequence by a first image node;

representing at least one video frame of the video sequence by a second image node;

compositing the video frame represented by the first image node with a corresponding path graphical primitive for extracting a predetermined shape of an image represented by a first primitive node of said compositing tree, according to at least one of an in compositing operation and an out compositing operation represented by a first composite node of said compositing tree, in order to generate a first composite image;

compositing the video frame represented by the second image node with a further corresponding path graphical primitive represented by a second primitive node of said compositing tree, according to the at least one compositing operation represented by a second composite node of said compositing tree, in order to generate a second composite image;

compositing the first and second composite images together, according to at least one of a plus compositing operation and an over compositing operation represented by a third composite node of said compositing tree, in order to render said image, wherein one or more attributes of said video frames are changeable by changing an attribute of the third composite node; and displaying said image on a display device.

2. The method according to claim 1, said method comprising the further step of setting said third composite node to a play mode to render said video frames sequentially together with said path graphical primitives.

3. The method according to claim 1, said method comprising the further step of setting said third node to a stop mode to stop the sequential rendering of said video frames.

4. The method according to claim 1, wherein the changeable attribute of said video frames is opacity.

5. The method according to claim 4, wherein said opacity of said third composite node is altered in response to a change in the opacity of the image nodes.

6. The method according to claim 1, wherein the changeable attribute of said video frames is play-back rate.

7. The method according to claim 1, wherein the changeable attribute of said video frames is frame position.

8. The method according to claim 1, wherein each of said video frames are stored in a memory buffer which is referenced by one of the first and second image nodes.

9. The method according to claim 1, said method comprising the further step of outputting the rendered image to a video file.

10. The method according to claim 1, wherein the video frames of the video sequence are retrieved from the video sequence adjacent to a required frame position.

11. The method according to claim 10, wherein said required frame position is dependent on a current update time and a frame rate of the video sequence.

12. The method according to claim 10, wherein opacities of said path primitive nodes are set according to the required frame position.

13. The method according to claim 1, wherein a change to one or more attributes of said compositing tree affects attributes of an associated audio node.

14. A method of creating a video node, said video node being created according to a compositing tree, said compositing tree comprising a plurality of nodes each representing a graphical primitive or an operation for combining said graphical primitives, said method comprising the steps of:

representing at least one video frame of a video sequence by a first image node;

representing at least one video frame of the video sequence by a second image node;

compositing the video frame represented by the first image node with a corresponding path graphical primitive for extracting a predetermined shape of an image, represented by a first primitive node of said compositing tree, according to at least one of an in compositing operation and an out compositing operation represented by a first composite node of said compositing tree, in order to generate a first composite image;

compositing the video frame represented by the second image node with a further corresponding path graphical primitive represented by a second primitive node of said compositing tree, according to the at least one compositing operation represented by a second composite node of said compositing tree, in order to generate a second composite image;

compositing the first and second composite images represented by the first and second composite nodes together, according to at least one of a plus compositing operation and an over compositing operation represented by said video node, in order to create said video node representing the video frames, wherein one or more attributes of said video frames are changeable by changing an attribute of said video node; and displaying one or more of the video frames on a display device using said video node.

15. The method according to claim 14, said method comprising the further step of setting said video node to a play mode to render said video frames sequentially together with said path graphical primitives.

16. The method according to claim 14, said method comprising the further step of setting said video node to a stop mode to stop the sequential rendering of said video frames.

17. The method according to claim 14, wherein the changeable attribute of said video frames is opacity.

18. The method according to claim 17, wherein said opacity of said video node is altered in response to a change in the opacity of the image nodes.

19. The method according to claim 17, wherein the changeable attribute of said video frames is play-back rate.

20. The method according to claim 14, wherein the changeable attribute of said video frames is frame position.

21. The method according to claim 14, wherein each of said video frames are stored in a memory buffer which is referenced by one of the first and second image nodes.

22. The method according to claim 14, wherein the video frames of the first and second video sequences are retrieved from the video sequence adjacent to a required frame position.

23. The method according to claim 22, wherein said required frame position is dependent on a current update time and a frame rate of the video sequence.

24. The method according to claim 22, wherein opacities of said path primitive nodes are set according to the required frame position.

25. The method according to claim 14, wherein a change to one or more attributes of said compositing tree affects attributes of an associated audio node.

26. An apparatus for rendering an image, said image being formed by compositing one or more graphical primitives according to a compositing tree, said compositing tree comprising a plurality of nodes each representing a graphical primitive of said image or an operation for combining said graphical primitives, said apparatus comprising:
   representation means for representing at least one video frame of a video sequence by a first image node and representing at least one video frame of a second video sequence by a second image node;
   first compositing means for compositing the video frame represented by the first node with a corresponding path graphical primitive for extracting a predetermined shape of an image, represented by a primitive node of said compositing tree, according to at least one of an in compositing operation and an out compositing operation represented by a first composite node of said compositing tree, in order to generate a second composite image;
   second compositing means for compositing the video frame represented by the second image node with a further path graphical primitive represented by a second primitive node of said compositing tree, according to the at least one compositing operation represented by a second composite node of said compositing tree, in order to generate a second composite image;
   third compositing means for compositing the first and second composite images represented by the first and second composite nodes together, according to at least one of a plus compositing operation and an over compositing operation represented by a third composite node of said compositing tree, in order to render said image, wherein one or more attributes of said video frames are changeable by changing an attribute of the third composite node; and
   displaying means for displaying said image on a display device.

27. An apparatus for creating a video node, said video node being created according to a compositing tree, said compositing tree comprising a plurality of nodes each representing a graphical primitive or an operation for combining said graphical primitives, said apparatus comprising:
   representation means for representing at least one video frame of a video sequence by a first image node and representing at least one video frame of the video sequence by a second image node;
   first compositing means for compositing the video frame represented by the first image node with a corresponding path graphical primitive for extending a predetermined shape of an image, represented by a first primitive node of said compositing tree, according to at least one of an in compositing operation and an out compositing operation each represented by a first composite node of said compositing tree, in order to generate a first composite image;
   second compositing means for compositing the video frame represented by the second image node with a further path graphical primitive represented by a second primitive node of said compositing tree, according to the at least one compositing operation represented by a second composite node of said compositing tree, in order to generate a second composite image;
   third compositing means for compositing the first and second composite images represented by the first and second composite node together, according to at least one of a plus compositing operation and an over compositing operation represented by said video node, in order to create said video node representing the video frames, wherein one or more attributes of the video frames are changeable by changing an attribute of said video node; and
   displaying means for displaying one or more of the video frames on a display device using said video node.

28. A computer readable storage medium encoded with a computer program for rendering an image, said image being formed by compositing one or more graphical primitives according to a compositing tree, said compositing tree comprising a plurality of nodes each representing a graphical primitive of said image or an operation for combining said graphical primitives, said computer readable storage medium comprising:
   means for representing at least one video frame of a video sequence by a first node;
   means for representing at least one video frame of the video sequence by a second image node;
   means for compositing the video frame represented by the first image node with a corresponding path graphical primitive for extracting a predetermined shape of an image, represented by a first primitive node of said compositing tree, according to at least one of an in compositing operation and an out compositing operation represented by a first composite node of said compositing tree, in order to generate a first composite image;
   means for compositing the video frame represented by the second image node with a further path graphical primitive represented by a second primitive node of said compositing tree, according to the at least one compositing operation represented by a second composite node of said compositing tree, in order to generate a second composite image;
   means for compositing the first and second composite images represented by the first and second composite nodes together, according to at least one of a plus compositing operation and an over compositing operation represented by a third composite node of said compositing tree, in order to render said image, wherein one or more attributes of said video frames are changeable by changing an attribute of the third composite node; and
   means for displaying said image on a display device.

29. A computer readable storage medium encoded with a computer program for creating a video node, said video node being created according to a compositing tree, said compositing tree comprising a plurality of nodes each representing a graphical primitive or an operation for combining said graphical primitives, said computer readable storage medium comprising:
   means for representing at least one video frame of a video sequence by a first image node;
   means for representing at least one video frame of the video sequence by a second image node;
   means for compositing the video frame represented by the first image node, with a corresponding path graphical primitive for extracting a predetermined shape of an image, represented by a first primitive node of said compositing tree, according to at least one of an in compositing operation and an out compositing operation represented by a first composite node of said compositing tree, in order to generate a first composite image;

means for compositing the video frame represented by the second image node with a further path graphical primitive represented by a second primitive node of said compositing tree, according to the at least one compositing operation represented by a second composite node of said compositing tree, in order to generate a second composite image;

means for compositing the first and second composite images represented by the first and second composite nodes together, according to at least one of a plus compositing operation and an over compositing operation represented by said video node, in order to create said video node representing the video frames, wherein one or more attributes of the video frames are changeable by changing an attribute of said video node; and means for displaying one or more of the video frames on a display device using said video node.

* * * * *

UNITED STATES PATENT AND TRADEMARK OFFICE
CERTIFICATE OF CORRECTION

PATENT NO.       : 7,403,209 B2
APPLICATION NO.  : 11/081724
DATED            : July 22, 2008
INVENTOR(S)      : Bin Liao et al.

It is certified that error appears in the above-identified patent and that said Letters Patent is hereby corrected as shown below:

<u>COLUMN 13</u>:

Line 32, "time base" should read --time-based--.
    Line 34, "frame base" should read --frame-based--.

Signed and Sealed this

Seventh Day of April, 2009

JOHN DOLL
*Acting Director of the United States Patent and Trademark Office*